(12) United States Patent
Azad et al.

(10) Patent No.: US 11,140,353 B2
(45) Date of Patent: Oct. 5, 2021

(54) MEDIA DEVICE WITH ON-BOARD PATCH ANTENNA WITH DUAL ANTENNA FEEDS

(71) Applicant: Amazon Technologies, Inc., Seattle, WA (US)

(72) Inventors: Mohammed Ziaul Azad, Pleasanton, CA (US); In Chul Hyun, Saratoga, CA (US); Chen Chen, Sunnyvale, CA (US); Amit Gaikwad, Fremont, CA (US); Jagan Vaidyanathan Rajagopalan, San Jose, CA (US); Deepak Pai Hosadurga, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 185 days.

(21) Appl. No.: 16/255,418

(22) Filed: Jan. 23, 2019

(65) Prior Publication Data

US 2019/0364239 A1    Nov. 28, 2019

Related U.S. Application Data

(63) Continuation-in-part of application No. 15/986,503, filed on May 22, 2018.

(51) Int. Cl.
*H01Q 9/04* (2006.01)
*H04N 5/38* (2006.01)
(Continued)

(52) U.S. Cl.
CPC ............... *H04N 5/38* (2013.01); *H01Q 9/045* (2013.01); *H04N 21/43635* (2013.01); *H01Q 23/00* (2013.01)

(58) Field of Classification Search
CPC .... H04N 5/38; H04N 21/43635; H01Q 9/045; H01Q 23/00; H01Q 9/0435; H01Q 1/38; H01Q 21/24; H01Q 1/2275
See application file for complete search history.

(56) References Cited

U.S. PATENT DOCUMENTS

| | | |
|---|---|---|
| 5,410,323 A | 4/1995 | Kuroda |
| 9,887,497 B1 | 2/2018 | Rajagopalan et al. |

(Continued)

OTHER PUBLICATIONS

EP App. No. 19730000.7, "Office Action," dated Jan. 15, 2021, 10 pages.

(Continued)

*Primary Examiner* — Andrea Lindgren Baltzell
*Assistant Examiner* — Michael M Bouizza
(74) *Attorney, Agent, or Firm* — Kilpatrick Townsend & Stockton LLP

(57) ABSTRACT

A streaming media player includes a printed circuit board, a video processor, a wireless communications processor, and a patch antenna. The patch antenna includes dielectric material, a conductive patch, and a first antenna feed in a first position with respect to the conductive patch. The patch antenna includes a second antenna feed in a second position with respect to the conductive patch. The first position is orthogonal to the second position. In an embodiment, the second position is rotationally offset from the first position by 90 degrees around an axis through a center of the conductive patch. The streaming media player includes a connector coupled to the video processor and configured to removably couple to a connection port on a display device.

18 Claims, 14 Drawing Sheets

(51) Int. Cl.
*H04N 21/4363* (2011.01)
*H01Q 23/00* (2006.01)

(56) References Cited

U.S. PATENT DOCUMENTS

| | | |
|---|---|---|
| 2008/0198082 A1* | 8/2008 | Soler Castany ......... H01Q 1/38 343/770 |
| 2012/0038529 A1 | 2/2012 | Yoo et al. |
| 2013/0072136 A1 | 3/2013 | Besoli et al. |
| 2013/0111521 A1 | 5/2013 | Klarke et al. |
| 2014/0242903 A1 | 8/2014 | Deluis et al. |
| 2014/0347233 A1 | 11/2014 | Mahanfar et al. |
| 2015/0234035 A1 | 8/2015 | Lohoefener et al. |
| 2016/0165304 A1 | 6/2016 | Klarke et al. |
| 2019/0020110 A1* | 1/2019 | Paulotto ................. H01Q 9/045 |
| 2019/0348749 A1* | 11/2019 | Thai ........................ H01Q 1/38 |

OTHER PUBLICATIONS

IN App. No. 202017052983, "Office Action," dated Aug. 18, 2021, 6 pages.

\* cited by examiner

MEDIA DEVICE WITH ON-BOARD PATCH ANTENNA WITH DUAL ANTENNA FEEDS

CROSS-REFERENCE TO RELATED APPLICATIONS

This application is a continuation-in-part of and claims priority to U.S. patent application Ser. No. 15/986,503 entitled "MEDIA DEVICE WITH ON-BOARD PATCH ANTENNAS" and filed on May 22, 2018.

BACKGROUND

Electronic devices can be interconnected by data connectors, and particularly video and audio connectors, to enable the transfer of video and audio signals. Electronic devices may include, without limitation, electronic book ("eBook") readers, mobile phones, video gaming systems, televisions, home theaters, speakers, media sticks, and desktop and laptop computers. When the electronic devices are connected to one another, video and audio signals are transmitted through a physical medium, such as a cable or wire that physically connects the electronic devices.

In an ideal environment, the video and audio signals are transmitted through the electrical connectors and cables without generating any unwanted electromagnetic radiation, often referred to as noise. Such noise may interfere with the operation of one of the connected electronic devices, or even the operation of other, nearby electronic devices.

As the frequencies of the video and audio signals being communicated through an electronic connector increases, so too does the frequency of the noise generated by such connector. If the data rate of the video and audio signals is sufficiently high, the electronic connectors may radiate electromagnetic noise having a frequency that overlaps with a wireless communication frequency or channel used by a nearby wireless communication system. In that case, if the noise is of sufficient magnitude, the noise may interfere with signals in the communication channel, making the wireless communication system unable to fully recover and decode the signals. Consequently, the wireless communication system may be forced to increase transmission power or reduce transmission data rate in order to communicate successfully.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1A:
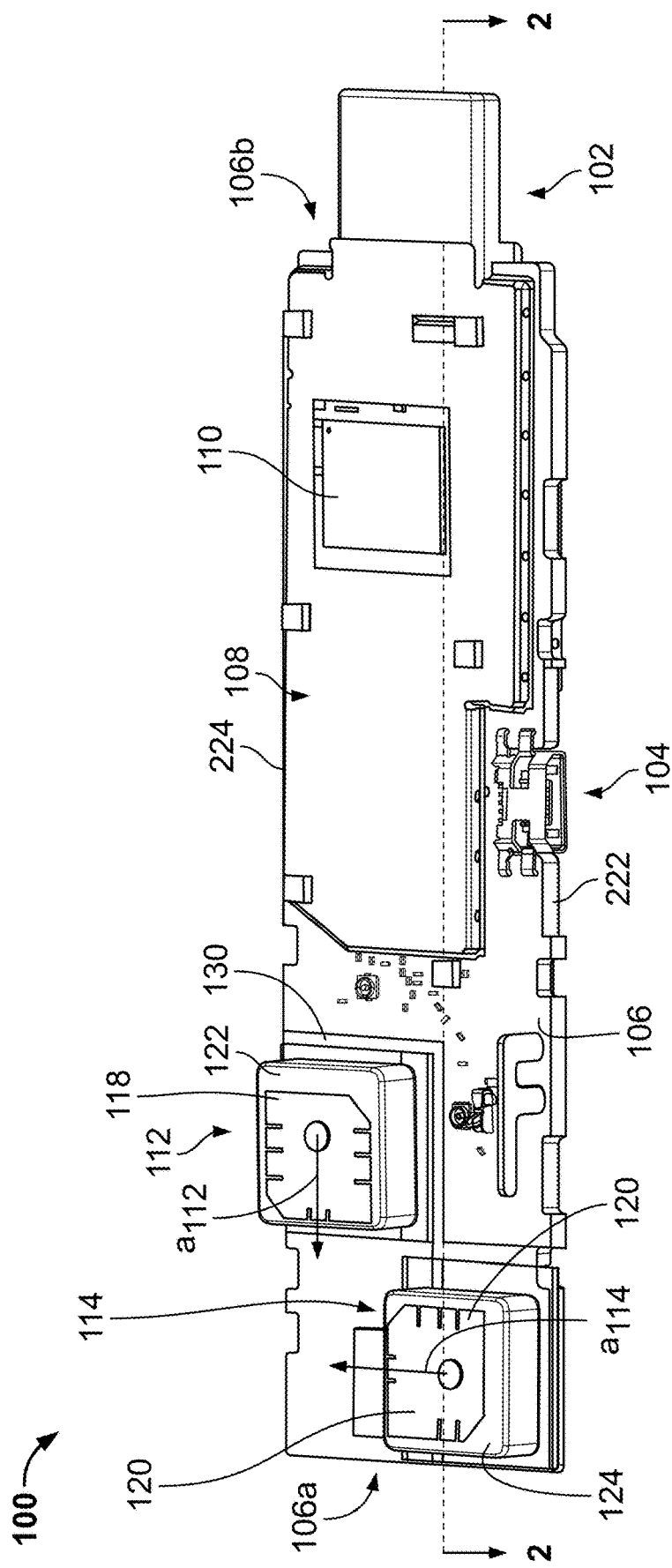
FIGS. 1A and 1B are perspective views illustrating portions of an example streaming media device.

Many electronic devices are implemented within small, compact packages. However, these denser electronic packages require a greater number of components to be packaged into increasingly smaller device volumes. In such proximity, these components may electrically interfere with one another.

For example, media sticks, also referred to as streaming media players, are electronic devices that combine video processing capabilities and wireless data transfer capabilities into a single, small platform. A streaming media player generally includes a media connector to physically couple the streaming media player to a television or other type of display device. With the streaming media player connected to a suitable port on the television or similar display device, the media player can transmit high quality video and audio signals to the television, which can, in turn, be displayed and played by the television. Such a streaming media player may also include a wireless communication system, enabling the streaming media player to download video content (e.g., from a video streaming service or device) that can then be converted into suitable video and audio signals for transmission to the television.

The wireless communication system also enables the media player to communicate wirelessly with remote control devices, enabling appropriate user control of the media player's operations. For example, a user may control the media player using a smart phone, a remote control device, a tablet, a computer, or other electronic devices running a corresponding application and in wireless communication with the smart media player.

Within such an electronic device, certain sensitive device components, such as the wireless communication system, may need to coexist, potentially on the same substrate, with electromagnetic noise generating components. In the case of a streaming media player, for example, the media player's components that are responsible for processing video data and communicating that video data into a connected television or display device can be a source of electromagnetic noise or radiation that could interfere with wireless communications.

The co-location of noisy video-processing components with the device's wireless communication systems and, specifically, the communication system's antennas, may pose several difficulties. In an idealized environment and for optimal antenna performance, there should be no metals in an effective volume around the antenna. However, in a packaged device, such as a media player, the electronic connectors for data transfer, such as a high-definition multimedia interface (HDMI) connector, video processors, and interconnecting traces typically include metal components and are located nearby the device's antenna or antennas. Because the electronic connectors and video processors can be sources of electromagnetic noise, such proximity can affect antenna and wireless communication system performance.

HDMI is an example standard that defines an audio/video interface for transferring uncompressed video data and compressed or uncompressed digital audio data from an HDMI-compliant source device, such as a display controller, to a compatible computer monitor, video projector, digital television, digital audio device, or other display or audio device. To couple a device configured to transmit video or audio content to a television, for example, a cable including two male connectors is typically coupled to the female connectors of the device and the television. But for smaller electronic devices, such as a streaming media player, in which a cable may not be desired, the media player may instead include a male HDMI connector configured to directly couple to the female connector in the television or display device. Such devices are referred to herein as HDMI devices, which are one type of streaming media players (sometimes referred to as media sticks).

In such an HDMI device, both the HDMI connector and device components used in processing video data may radiate noise into wireless communication channels and cause degradation of the wireless communication capabilities of such an HDMI device. For example, HDMI connectors include a plurality of HDMI signal pins, where each signal pin may carry a portion of the video signal or other data signals being transmitted through the HDMI connector by the HDMI device. In some instances, the HDMI signal pins may function as small antennas to broadcast or radiate undesired electromagnetic signals in the wireless communication channels.

In that case, the signal broadcast or radiated by a particular HDMI signal pin is largely dependent upon the data signal being transmitted through the signal pin. As the frequency of the data signal changes, the frequency of the electromagnetic noise being radiated by the signal pin may also change. If, for example, the HDMI device communicates with a wireless router using a 2.4 gigahertz (GHz) frequency band or a 5 GHz frequency band, the HDMI signal pins as well as other conductors carrying video signals could radiate noise that interferes with wireless communications if the HDMI signal pins generate radiation that has a frequency overlapping with the wireless communication band. Thus, it can be desirable to design streaming media players and, specifically, the wireless communication systems of such devices to minimize interference with other components of the streaming media player, such as video processors and HDMI or other media connectors.

In the present streaming media player, to reduce the size of the device's footprint, the device's wireless communication system incorporates one or more patch antennas mounted over a device substrate (e.g., printed circuit board (PCB)). To minimize interference, the one or more antennas are configured as at least partially directional antennas, where the one or more antennas demonstrate reduced sensitivity in a direction of the device's video processing system. This renders the one or more antennas less susceptible (i.e., less sensitive) to noise originating from the direction of the device's noise-generating components. Similarly, the directionality of the one or more antennas may provide that the antennas, when broadcasting, radiate reduced noise towards the device's video processing components. In this configuration, the one or more antennas both absorb less of the noise that may be radiated by the device's video processing components and media connectors and, conversely, transmit less noise into those same components.

The radiation patterns and, therefore, the directional sensitivity of the device's one or more patch antennas are at least partially achieved by the specific construction of the antennas. In the present disclosure the antennas are implemented as high-dielectric patch antennas. The antennas may include a ground plate, which is tied to a ground or common voltage node. The ground plates of each antenna can be electrically isolated from the other components of the media device. The antennas include a top conductive plate, which operates as the signal radiating and receiving portion of the antennas. When transmitting wireless signals, a signal line, electrically connected to or electromagnetically coupled to the top conductive plate, receives the signal to be transmitted from the device's wireless communications system. Conversely, upon receipt of a signal at the top conductive plate of the antenna, the received signal is communicated through the connected signal line to the device's wireless communication system, where the signal can be decoded and appropriate action taken.

Within an antenna, the top conductive plate is patterned to include a number of notches and rounded or chamfered corners. The specific geometrical configuration of the top plate, and the placement of the various notches formed therein, operates to establish the desired directionality and frequency of operation of the antennas, as described herein.

In the present device, the device's two antennas may be implemented as two separate patch antenna structures or may be combined together into a single patch antenna structure. The combined antenna structure includes a high-dielectric body and a top conductive plate. The antenna structure includes two antenna feeds. The feeds are conductive structures that are positioned in proximity to the top conductive plate of the antenna structure, but do not directly contact the top conductive plate. The feeds may be positioned, for example, on the device's substrate underneath a portion of the high-dielectric body of the antenna structure, on side walls of the antenna structure, or positioned within or above the high-dielectric body. The feeds are connected to respective signal lines to receive respective first and second signals from the device's communication system. Because they are in proximity to the antenna structure's top plate, the feeds electromagnetically couple to the conductive top plate to radiate the signals output by the device's communication system or to receive radio frequency signals absorbed by the top conductive plate. As such, the first and second feeds, in combination with the top conductive plate of the antenna structure, operate as the first and second antennas of the device's communication system.

To provide improved isolation from the device's other noise generating components and interference between the antennas, the first and second feeds of the antenna structure may be positioned so that the resulting antennas are orthogonal to one another. In such a configuration the first antenna feed is not sensitive to signals transmitted by the antenna's second antenna feed. And, conversely, the second antenna feed is not sensitive to signals transmitted by the antenna's first antenna feed, As such, the two antenna feeds, being orthogonal to one another, do not interfere with each other's activities.

To further isolate the media device's antennas from the video processing components, the device's antenna structure is physically and electrically isolated upon the device's substrate. Specifically, the device's substrate, which is a non-conductive isolator, such as Teflon or layers of cloth and insulative resin, includes a region (referred to herein as a ground moat, ground break, or ground isolation region) that separates the antennas from the remaining device components mounted to the substrate of the device. Specifically, no conductive structures (e.g., traces carrying video or audio data or reference voltages or other chips or integrated circuits) are formed over or mounted within this ground break region, either on the top surface of the substrate or the bottom surface of the substrate. By physically separating such conductive traces and structures from the device's antennas, the potential for noise coupling between the antennas and those conductive structures through the substrate can be reduced.

In a typical application, the ground break region may have a width of at least 1 millimeter or 1.5 millimeters and run across the entire width of the device's substrate between the device's antennas and remaining components. As described below, the ground break region is not required to be linear, and may zig-zag or curve around components or traces mounted to or formed within the device's substrate to maintain the desired separation between antennas and other device components.

As described above, a typical streaming media player, such as an HDMI device, may be configured to process video data of different resolutions. Because the different resolutions require the video data to be processed at different rates, the frequency of noise generated by video processing activities and video signals transmissions can depend on the type of video being processed. For example, when processing 4K video data (i.e., video data having a horizontal resolution of about 4,000 pixels and frame rates up to 120 Hertz), the video processing components and media connector of a device can generate noise that could interfere with both 2.4 GHz and 5 GHz WIFI communication bands. Due to the data-rate requirements of such high-resolution data signals, those frequencies cannot be filtered out of the device's data stream. But when processing video data having lower resolutions (e.g., 1080 p and below), filtering can be applied to the video signal path to filter out frequencies (e.g., 2.4 GHz and 5 GHz) that could interfere with device wireless communications.

As such, the present device may incorporate a filter circuit in or connected to the video data signal path to filter out video signal frequencies that could generate interference or noise for the device's wireless communication system. The filter circuit may be a smart filter that is configured to only filter out those frequencies when the device's video components are processing video data at a sufficiently low resolution that allows for filtering of those frequencies. But if the device is processing high resolution video data (e.g., 4K or higher), the filter may be deactivated so as to not interfere with video signal transmission.

Figure 1B:
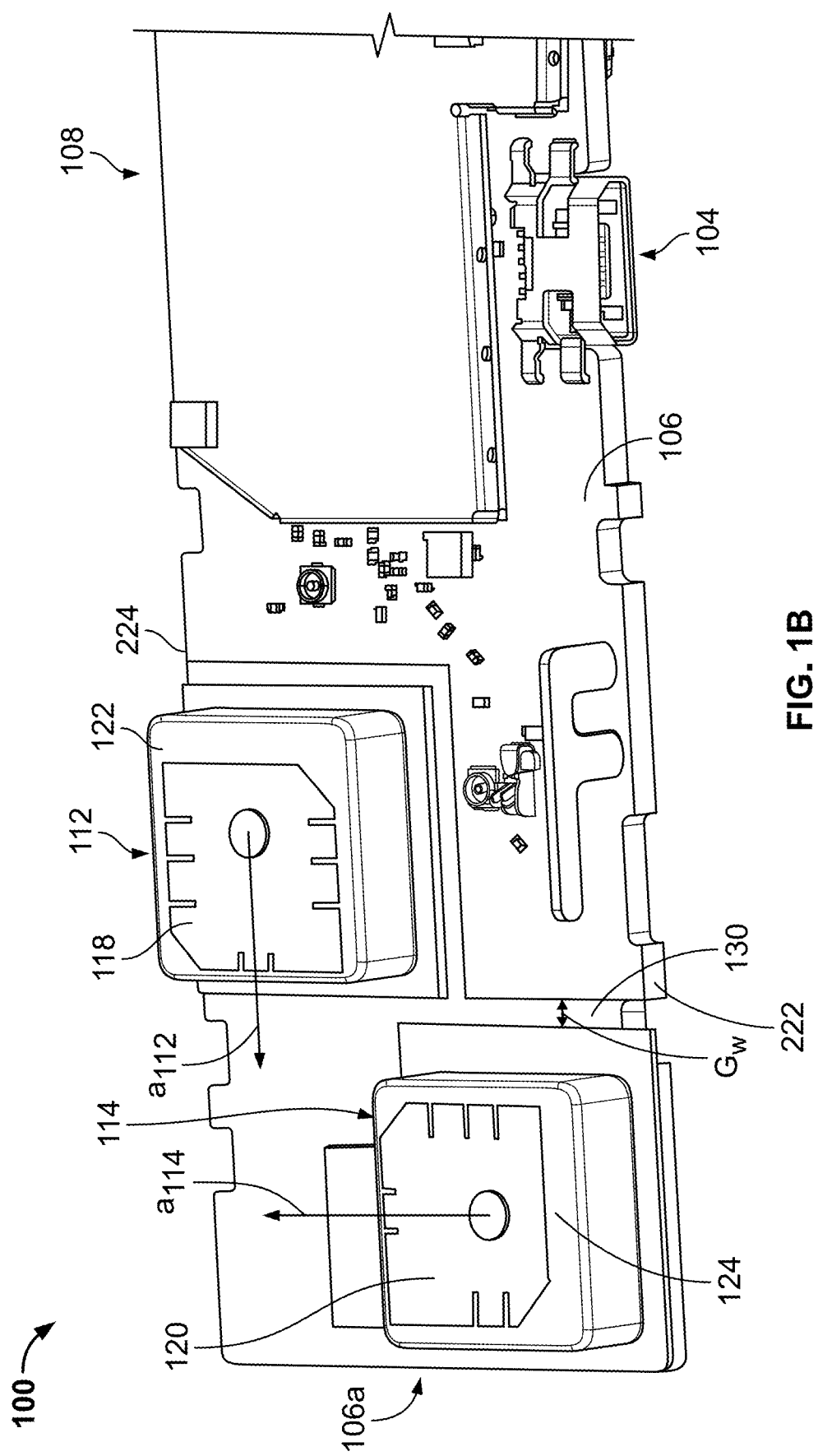

Turning now to the figures, FIG. 1A illustrates an example media device 100 according to various embodiments. FIG. 1B illustrates an enlarged view of a portion of media device 100 shown in FIG. 1A. In this example, media device 100 includes a media connector 102 (e.g., an HDMI media connector) enabling media device 100 to be connected to a suitable display device (e.g., a computer monitor or television) to enable media device 100 to deliver content including video and audio data to the display device. In various other embodiments, connector 102 may be a different type of media connector configured to transmit video and audio data into a connected display device. Another connector 104 is configured to allow media device 100 to receive instructions and data—e.g., control instructions and configuration data—from a connected control device, such as a laptop or personal computer. In some cases, connector 104 may also allow for device 100 to receive video and audio content from a remote source coupled directly to connector 104.

Media device 100, which may, in various embodiments, be an HDMI device, include a substrate 106, such as a printed circuit board (PCB). A number of components (i.e., integrated circuits and other discrete components) of media device 100 are attached to a surface of substrate 106. Additionally, conductive traces can be attached to substrate 106 (e.g., via lamination) in order to electrically interconnect the various components of media device 100. In some embodiments, substrate 106 may be a multi-layer PCB, in which multiple layers of conductive traces can be formed over or within an interior region of substrate 106.

Media device 100 includes a video processing system 108 that may include a video processor 110 mounted to a surface of substrate 106. Video processing system 108 is configured to process video data and related audio data. For example, video processing system 108 may process video data that includes content in various video modes, such as 720 p, 1080 p, or 4K, where each mode may correspond to different resolutions or frame rates in the video content. In various embodiments, video processing system 108 may be implemented using a low-power mobile multimedia processor architecture that is sufficiently flexible and efficient to decode video data in real time.

As video processing system 108 decodes and processes video data (e.g., binary data encoding video images), video processing system 108 generates a corresponding output video signal at the desired video mode (e.g., 720 p, 1080 p, or 4K). The video signal is an analog signal encoding at least a portion of the video data that can be transmitted to a display device. The display can then, in turn, decode the video signal and display the encoded video on the display device's screen. The video signal is transmitted from video processing system 108 (i.e., along one or more conductive traces formed over or within substrate 106) to the output media connector 102. Specifically, the video signal is outputted to signal pins—lengths of conductive material configured to engage with signal pins in a display device's HDMI connector—contained within media connector 102. The video signal is then communicated through the signal pins of media connector 102 to the connected display device (e.g., a television or computer display screen).

As video processing system 108 processes video data to generate output video signals which are, ultimately, communicated through media connector 102 to a connected display device, the video signals can generate radio frequency (RF) radiation as the signal passes through various conductive structures. Specifically, the video signals can be at a sufficiently high frequency that the traces and interconnects formed within media device 100 connecting video processing system 108 to media connector 102 can operate as small antennas that radiate corresponding RF signals as the video signal passes through them. The frequency component of such RF radiation may vary based upon the frequency of the video signal being transmitted through the corresponding conductive structures of media player 100.

Generally, the frequency of the video signal will increase as the video signal's resolution increases. Video data signals that include common high definition video modes (e.g., 720 p, 1080 p, or 4K) have been found to have frequency components that overlap with the frequency bands used by conventional wireless communications technologies, referred to as the working frequencies of the wireless communications technologies.

For various common video resolutions, data rates can be relatively high –8K video resolutions can require data rates of up to 48 gigabits per second (Gbps) or more, 4K video resolutions can require data rates of up to 16 Gbps or more, and 1080 p video resolutions can require data rates of up to 5 Gbps or more. At such high resolutions and data rates, video processing system 108 and media connector 102 of media device 100 (as well as components of a connected display device) can generate RF radiation at frequencies within the common WIFI bandwidths of 2.4 GHz and 5 GHz. Such radiation can interfere with the performance of nearby wireless communication systems. Specifically, the interference can reduce the signal-to-noise ratio of data received and/or transmitted by such a wireless communication system, which can, in turn, reduce data rates via that communication system. In some cases, the interference can also reduce the range at which a wireless communication system can communicate with its access point.

Media device 100 includes a wireless communication system. The wireless communication system includes antenna 112 and antenna 114. Both antennas 112 and 114 are mounted to substrate 106, as depicted in FIGS. 1A and 1B. Antennas 112 and 114 are configured to transmit and receive RF signals in a predetermined range of wireless communication frequencies or channels. For example, the wireless communication system may support 802.11a/b/g/n WIFI networks. The 802.11a communication standard uses the 5 GHz band defined by Unlicensed National Information Infrastructure (U-NII). The 802.11b and 802.11g communication standards use the 2.4 GHz band defined by Industrial, Scientific and Medical (ISM). The 802.11n communication standard can use either the 2.4 GHz or the 5 GHz band. Both the 2.4 GHz band and the 5 GHz band include multiple channels to be used by multiple devices.

In various embodiments, the wireless communication system of media device 100 may transmit wireless signals using both antennas 112 and 114 simultaneously. But in some cases, the wireless communication system may only transmit or receive signals on a single antenna 112 or 114 at a time. For example, one of antennas 112 and 114 may experience a substantially better performance than the other antenna (e.g., a higher received signal strength indicator) in which case the wireless communication system may use that antenna primarily for communications—at least until detecting a change in received signal strength experienced by the antennas 112 and 114.

The predetermined range of wireless communication frequencies utilized by the wireless communication system of media device 100 may include one or more WIFI channels in one or more communication bandwidths. Here, a communication bandwidth is an interval in the frequency domain, which may be delimited by a lower frequency and an upper frequency. For example, the 2.4 GHz band may include WIFI channels having a lower frequency of 2.4 GHz and an upper frequency of 2.5 GHz. The 5 GHz band may include WIFI channels having a lower frequency of 4.8 GHz and an upper frequency of 5.2 GHz. In some embodiments, the wireless communication system of media device 100 may support other wireless communication standards such as Bluetooth, which may utilize different bandwidths and channels for communications where the different bandwidths span different ranges of frequencies.

Both antennas 112 and 114 are configured as patch antennas that are surface- mounted to substrate 106. Patch antennas, sometimes referred to as microstrip antennas, generally include a flat patch of conductive material positioned over a dielectric or insulative material. The dielectric or insulative material is, in turn, positioned over a ground plane. An RF signal is applied to the antenna's patch via a signal line and, in turn, the patch radiates a wireless transmission in accordance with the applied RF signal. Conversely, when a wireless signal impinges upon the patch, the patch generates a corresponding electrical signal that is communicated into the signal line that is electrically connected to the patch.

In an embodiment of media device 100, antennas 112 and 114 may be configured for communications over a first bandwidth (e.g., the 2.4 GHz bandwidth of WIFI). Such a media device 100 may include additional antennas (not shown in FIGS. 1A and 1B), such as trace antennas, configured for communications using different bandwidths (e.g., the 5 GHz bandwidth of WIFI).

In the configuration of FIGS. 1A and 1B, antennas 112 and 114 are similarly constructed, but are mounted to substrate 106 in positions so that the antennas are orthogonal to one another. Specifically, the orientation of antenna 112 on substrate 106 is offset from the orientation of antennas 114 by 90 degrees—antenna 112 is offset by rotation counter-clockwise 90 degrees from the orientation of antenna 114.

Because antennas 112 and 114 have similar construction (as described in more detail below), it is possible to define a primary axis for each of antennas 112 and 114—see axis $a_{112}$ for antenna 112 and axis $a_{114}$ for antenna 114. The primary axes of each of antennas 112 and 114 may be defined with respect to specific features or geometrical attributes of the patch antennas. With reference to FIG. 1A, for example, the primary axis of each of antennas 112 and 114 runs from the center of each patch antenna orthogonally towards the edge of patches 118 and 120, respectively, that includes two notches. With a common primary axis defined for each of antennas 112 and 114, the antennas can be positioned on substrate 106 in a configuration so that the antennas 112 and 114 are rotationally offset from one another.

As seen in FIG. 1A, axis $a_{112}$ is rotated 90 degrees counter-clockwise from axis $a_{114}$ so that antenna 112 is rotationally offset from antenna 114 by 90 degrees. As such, axis $a_{112}$ is at a first angle with respect to an axis running along the length of substrate 106 and, similarly, $a_{114}$ is at a second angle with respect to an axis running along the length of substrate 106. In such a configuration, to rotationally offset antenna 112 from antenna 114 by 90 degrees, the first angle differs from the second angle by 90 degrees.

Figure 2:
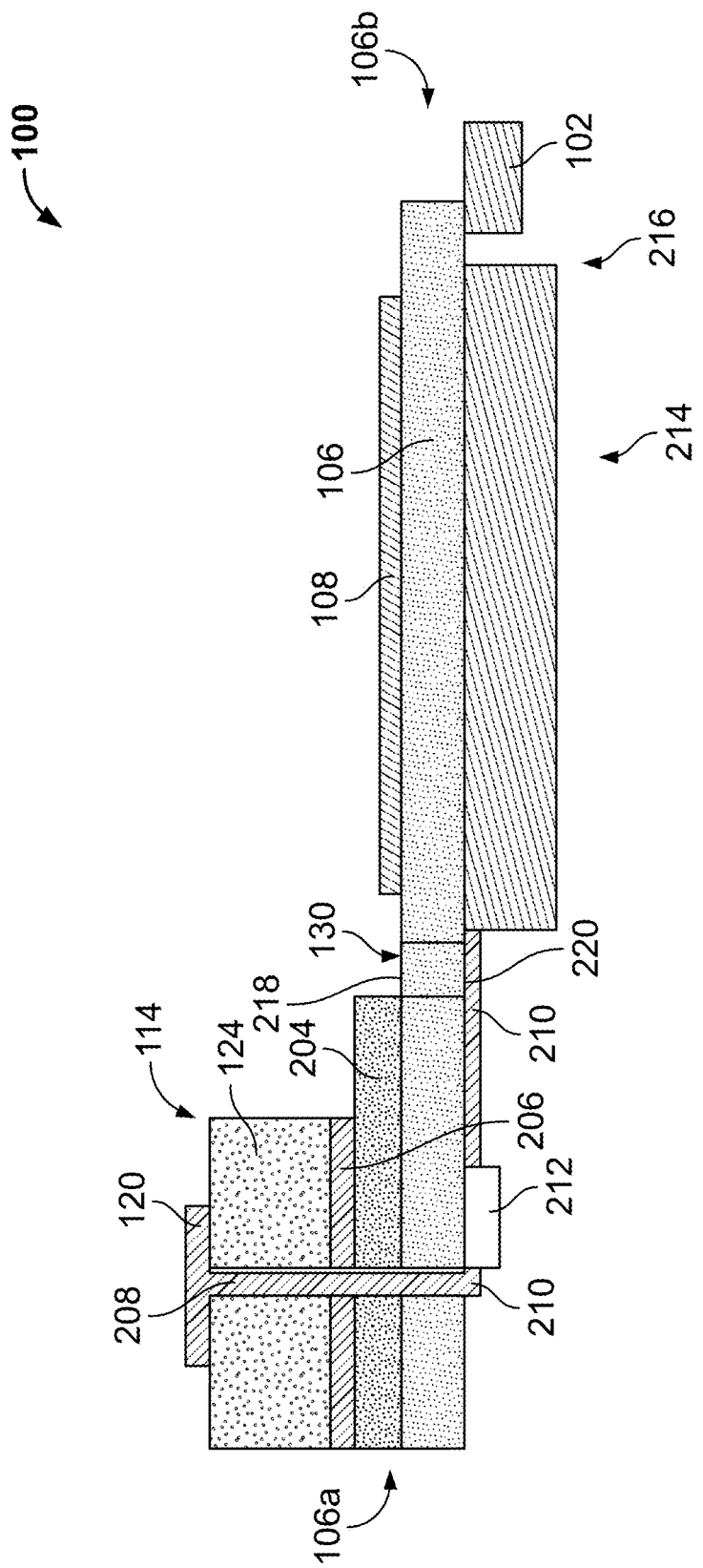
FIG. 2 is a cross-section view of the media device depicted in FIGS. 1A and 1B.

In still other embodiments, in which antennas 112 and 114 may be implemented using different configurations than that depicted in FIGS. 1A, 1B, and 2, different rotational offsets may be utilized to cause antennas 112 and 114 to be orthogonal to one another (and, specifically, so that the RF signals radiated by each of antennas 112 and 114 are orthogonal to one another).

In this orthogonal configuration, antennas 112 and 114 are configured to each transmit signals that are not detected or otherwise received by the other antenna. Accordingly, when antenna 112 broadcasts a signal, because antenna 114 is orthogonal to antenna 112, antenna 114 does not receive (e.g., is not sensitive to) the signal or the received signal has a negligible magnitude (e.g., equal to or less than a magnitude of noise observed by the antenna) so that the signal is ignored by the radio controller connected to antenna 114. Making antennas 112 and 114 orthogonal to on another can reduce the likelihood that the antennas 112 and 114 interfere with one another. Additionally, because the antennas 112 and 114 are orthogonal to one another, this configuration can increase the likelihood that at least one of antenna 112 and 114 can communicate successfully with an external wireless communication system. If, for example, antenna 112 is positioned and/or orientated so that antenna 112 is at least partially orthogonal to the antenna of a remote wireless communication system, and, therefore, may not communicate successfully with that system, antenna 114, being orthogonal to antenna 112, may be better positioned and/or oriented to communicate with the antennas of that remote system.

Additionally, antennas 112 and 114 may be mounted to substrate 106 so that antennas 112 and 114 are physically offset from one another on substrate 106. With reference to FIG. 1A, antennas 112 and 114 are offset from one another both across the width of media device 100 and along the length of media device 100. In typical applications, antennas 112 and 114 may be offset along the length of media device (see lengthoffset in FIG. 1B) by a distance ranging from 6 millimeters to 12 mm, though in other implementations, different length offsets may be utilized. Similarly, antennas 112 and 114 may be offset across the width of media device (see width$_{offset}$ in FIG. 1B) by a distance ranging from 2 millimeters to 8 mm, though in other implementations, different width offsets may be utilized.

The combination of offsets of antennas 112 and 114—including both rotational and, optionally, length and width offsets—can effectively increase the isolation of each of antennas 112 and 114, which can, in turn, reduce the degree to which noise generated by video processing system 108 and media connector 102, as described above, is absorbed by both antennas 112 and 114.

Conventional antennas typically exhibit asymmetric noise coupling. This can detrimentally affect wireless communications by both increasing false packet detection and reducing the effectiveness of maximum ratio combining, which can be a techniques to increase communication system throughput. But in the present designs and in the configuration of FIGS. 1A, 1B, and 2, antennas 112 and 144 are generally configured to exhibit symmetric noise coupling. This can improve wireless communication system performance by reducing false packet detection and enabling more effective maximum ratio combining.

Both antennas 112 and 114 are tuned so as to be most sensitive to wireless transmissions occurring within a particular bandwidth. For example, antennas 112 and 114 may be tuned specifically for communications occurring in the 2.4 GHz band for WIFI communications. In other embodiments, antennas 112 and 114 may be tuned for wireless communications occurring in the 5 GHz band for WIFI communications. Antennas 112 and 114 may be tuned for communications in the same bandwidth or, in some cases, each of antennas 112 and 114 may be tuned for communications in different bandwidths.

Antennas 112 and 114 each include conductive patches 118 and 120, respectively. Patches 118 and 120 include a conductive material, such as silver, gold, aluminum or copper, mounted over dielectric material 122 and 124, respectively and described in more detail below. Patches 118 and 120 are patterned with a series of notches or teeth and chamfered corners to tune patches 118 and 120 to the desired operational frequencies of antennas 112 and 114. In an embodiment, patches 118 and 120 may each have a surface area of about 144 mm$^2$, in which patches 118 and 120 each have a length and width of 12 mm. Again, however, in different implementations (e.g., in which the antennas are configured to radiate and receive signals having different frequencies), the geometry (e.g., the length, width, and depth) of patches 118 and 120 may be adjusted.

To further illustrate the construction of antennas 112 and 114, FIG. 2 is a cross-sectional view of media device 100 taken along line 2-2 of FIG. 1A. In this view, a cross-sectional view of antenna 114 is depicted. It should be understood that the construction of antenna 112 is similar to that of antenna 114 and so both antennas would have similar cross-sections, though their rotational position on substrate 106 may differ, as described herein.

Antenna 114 is mounted over substrate 106. Substrate 106 may include one or more layers of PCB material. As shown in FIG. 2 an additional and optional layer 202 of substrate material is formed over substrate 106 underneath antenna 114. In an embodiment, layer 202 includes an FR4 material that may include a woven fiberglass or other insulative material.

Antenna ground 206 is formed over substrate 106 and, specifically, layer 202 of substrate 106. In configurations that do not include layer 202, antenna ground 206 may be formed or laminated directly upon substrate 106. Antenna ground 206 includes a conductive material (e.g., a metal, such as copper or aluminum) that may be laminated or otherwise mounted over substrate 106. Antenna ground 206 is connected to a ground plane (e.g., an antenna island ground) of substrate 106. In such an embodiments, the ground plane (not illustrated in FIGS. 1A and 1B), does not cross ground isolation region 130, so that at least in some embodiments, antenna ground 206, even when connected to a ground plane, may be electrically floating with respect to the other electrical components (e.g., video processor 110 and media connector 102) of device 100 which may be connected to another ground node that is electrically separated from the ground plane to which antenna ground 206 is connected.

Dielectric material 124 is mounted over antenna ground 206. Typically, dielectric material 124 has a relatively high dielectric constant that may range from 25-75. In a specific embodiment, the dielectric constant of dielectric material 124 may be 35 or greater (e.g., 38), for example. In embodiments, dielectric material 124 may have a similar length and width to the geometry of patches 118 and 120 (e.g., length of 12 mm and width of 12 mm). By incorporating a relatively high dielectric material into dielectric material 124, the electric field of antenna 114 can be concentrated resulting in less ground current, which may result in reduced noise transmissions between antennas 114 and video processing system 108, for example.

Dielectric material 124 may be formed over antenna ground 206 using any suitable fabrication process. For example, dielectric material 124 could be applied in a liquid or semi-liquid state and molded into the shape of dielectric material 124. Alternatively, dielectric material 124 may be fabricated as a solid block of material that is fastened or adhered (e.g., via a glue or adhesive) to a top surface of antenna ground 206. In some embodiments, dielectric material 124 is configured to absorb radio frequency transmissions in a predetermined range of wireless communication frequencies. Dielectric material 124 may include at least one of a silicon absorber, Teflon, liquid crystal polymer (LCP), etc.

Via 208 is formed through dielectric material 124, antenna ground 206, and substrate 106 (including layer 204 over substrate 106). Via 208 may be manufactured by first forming a hole or passageway through those structures and then depositing a conductive material into the hole or passageway.

Finally, patch 120 is positioned over dielectric material 124 and electrically connected to via 208. As described above, patch 120 has a specific geometry (including the pattern of slits and chamfered corners) configured to tune patch 120 to the desired operational frequency of antenna 114.

Via 208 is electrically connected (e.g., via soldering) to signal line 210. Via 208 is not electrically connected to and is electrically isolated from antenna ground 206. Signal line 210 may be implemented as a transmission line and may include a number of matching components 212 configured to provide an impedance match between signal line 210 and antenna 114.

Signal line 210 is connected to a wireless communications processor 214 that may be mounted, as shown in FIG. 2, to a backside 216 of substrate 106 of media device 100. Wireless communications processor 214 is configured to receive and decode signals received via antenna 114 and antenna 112 (not shown in FIG. 2). Once decoded, the data contained within such signals may be forwarded to other components of media device 100 (e.g., video processing system 108 or a system controller) for processing. Conversely, wireless communications processor 214 may receive data to be transmitted from other components of media device 100. Wireless communications processor 214 is configured to convert that data into an appropriate signal for transmission via antenna 114 (or, alternatively, antenna 112). That signal is then transmitted along signal line 210 to patch 120 where it will be radiated by antenna 114.

Antennas 112 and 114 are further electrically isolated from the other components of media device 100 by a ground isolation region 130 of substrate 106. Ground isolation region 130, also referred to as a ground break or ground moat, generally includes a region of substrate 106 over which no electrical components, such as integrated circuits or discrete components, or traces are formed, with the exception of signal line 210 which forms the connection between antennas 112 and 114 and wireless communications processor 214. Additionally, no electrical components, such as integrated circuits or discrete components, are electrically coupled to ground isolation region 130 and, as such, integrated circuits or discrete components mounted over or mounted to substrate 106 do not transfer electrically energy into ground isolation region 130 or, as described herein, across ground isolation region 130 of substrate 106. Specifically, no electrical components or traces are formed over either a top surface 218 of ground isolation region 130, or a bottom surface 220 of region 130, again, with the exception of signal line 210.

As illustrated in FIG. 1A, substrate 106 includes a first end 106a and a second end 106b, opposite first end 106a. Patch antennas 112 and 114 are mounted to substrate 106 closer to end 106a than 106b. Conversely, media connector 102 is connected to substrate 106 closer to end 106b than 106a. Additionally, ground isolation region 130 is formed on or within substrate 106 closer to patch antennas 112 and 114 than media connector 102.

In essence, ground isolation region 130 provides for a minimum distance of separation between the device's antennas (i.e., antennas 112 and 114) and the other metal-containing and noise-generating components of media device 100. This physical separation can, to some degree, reduce an amount of noise that is conducted along substrate 106 from those components (e.g., video processing system 108) into antennas 112 and 114.

As depicted in FIGS. 1A and 1B, although ground isolation region 130 may be non-linear (region 130 zig-zags around various components of media device 100), ground isolation region 130 has a minimum width (see width $G_w$ in FIG. 1B) that is maintained along the entire length of ground isolation region 130. Additionally, ground isolation region 130 extends from first edge 222 of substrate 106, across substrate 106, without interruption, to the opposite edge 224 of substrate 106. In this manner, ground isolation region 130 extends contiguously (i.e., without interruption or break) across the entire width of substrate 106.

In embodiments of the media device, portions of ground isolation region 130 may in fact have a width that is greater than a particular minimum width, but ground isolation region 130 is formed so as to always have a width greater than or equal to the minimum width. In a typical implementation, that minimum width may be between 1 millimeter and 1.5 millimeters. But in other implementations, different minimum widths, such as minimum widths varying between 0.3 millimeters and 3 millimeters, may be utilized. Typically, the minimum width of ground isolation region 130 may be determined by the application of media device 100, with different media device 100 configurations requiring different minimum widths in order to achieved desired system performance.

As depicted in FIGS. 1A, 1B and 2, antennas 112 and 114 are mounted to substrate 106 on a first side of substrate 106 from ground isolation region 130 and other components of media device 100 (e.g., video processing system 108 and media connector 102) are mounted on a second side of substrate 106.

Figure 7:
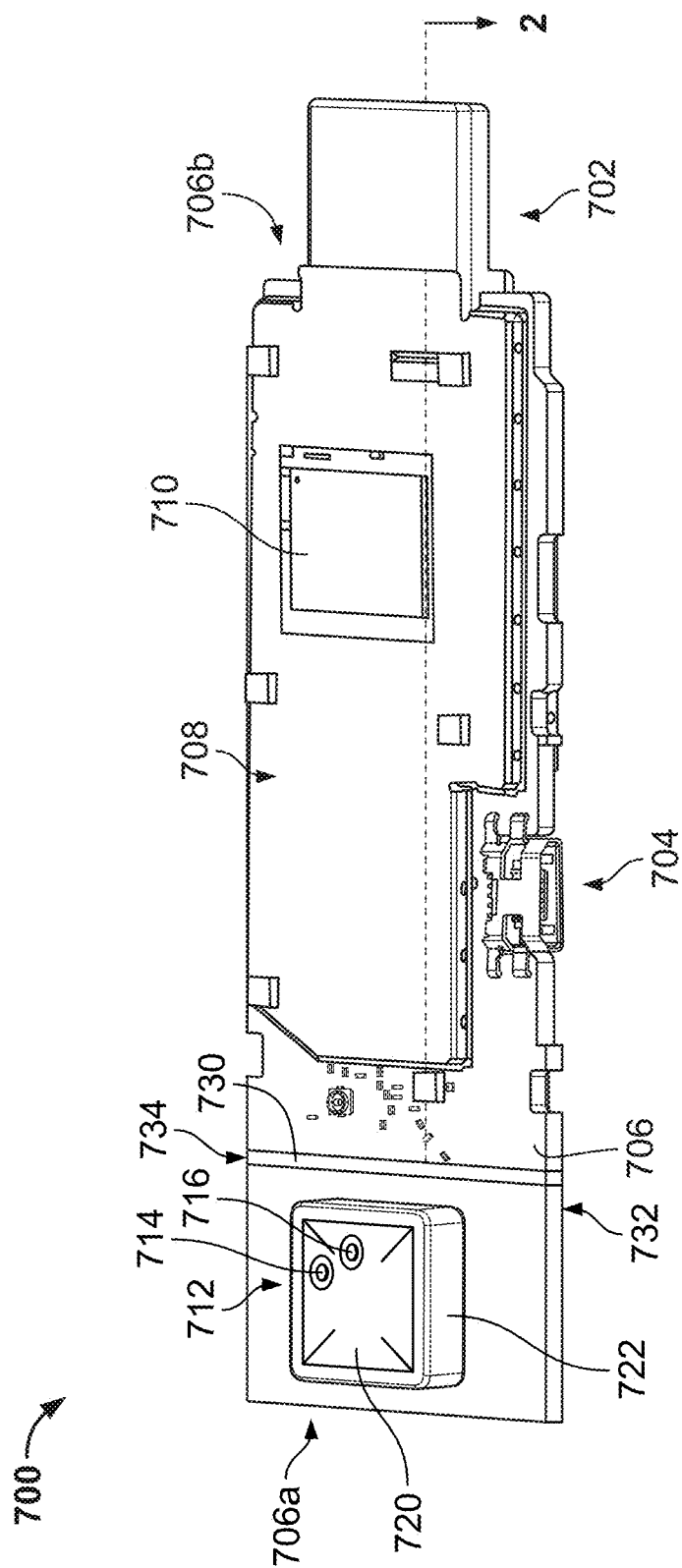
FIG. 7 is a perspective view of a streaming media device including an antenna containing first and second antenna feed structures.

FIG. 7 illustrates an example media device 700 according to various embodiments in which device 700 includes an antenna structure containing dual orthogonal antenna feeds. Media device 700 includes a media connector 702 (e.g., an HDMI media connector) enabling media device 700 to be connected to a suitable display device (e.g., a computer monitor or television) to enable media device 700 to deliver content including video and audio data to the display device. In various other embodiments, connector 702 may be a different type of media connector configured to transmit video and audio data into a connected display device. Another optional connector 704 is configured to allow media device 700 to receive instructions and data—e.g., control instructions and configuration data—from a connected control device, such as a laptop or personal computer. In some cases, connector 704 may also allow for device 700 to receive video and audio content from a source coupled directly to connector 704.

Media device 700, which may, in various embodiments, be an HDMI device or streaming media player, includes a substrate 706, such as a PCB. A number of components (i.e., integrated circuits and other discrete components) of media device 700 are attached to a surface of substrate 706.

Additionally, conductive traces can be attached to substrate 706 (e.g., via lamination) in order to electrically interconnect the various components of media device 700. In some embodiments, substrate 706 may be a multi-layer PCB, in which multiple layers of conductive traces can be formed over or within an interior region of substrate 706.

Media device 700 includes video processing system 708 that may include a video processor 710 mounted to a surface of substrate 706. Video processing system 708 is configured to process video data and related audio data. For example, video processing system 708 may process video data that includes content in various video modes, such as 720 p, 1080 p, or 4K, where each mode may correspond to different resolutions or frame rates in the video content. In various embodiments, video processing system 708 may be implemented using a low-power mobile multimedia processor architecture that is sufficiently flexible and efficient to decode video data in real-time.

As video processing system 708 decodes and processes video data (e.g., binary data encoding video images), video processing system 708 generates a corresponding output video signal at the desired video mode (e.g., 720 p, 1080 p, or 4K). The video signal is a signal encoding at least a portion of the video data that can be transmitted to a display device. The display can then, in turn, decode the video signal and display the encoded video on the display device's screen. The video signal is transmitted from video processing system 708 (i.e., along one or more conductive traces formed over or within substrate 706) to the output media connector 702. Specifically, the video signal is outputted to signal pins—lengths of conductive material configured to engage with signal pins in a display device's HDMI connector—contained within media connector 702. The video signal is then communicated through the signal pins of media connector 702 to the connected display device (e.g., a television or computer display screen).

As video processing system 708 processes video data to generate output video signals which are, ultimately, communicated through media connector 702 to a connected display device, the video signals can generate RF radiation as the signal passes through various conductive structures. Specifically, the video signals can be at a sufficiently high frequency that the traces and interconnects formed within media device 700 connecting video processing system 708 to media connector 702 can operate as small antennas that radiate corresponding RF signals as the video signal passes through them. The frequency component of such RF radiation may vary based upon the frequency of the video signal being transmitted through the corresponding conductive structures of media player 700. Video data signals that include common high definition video modes (e.g., 720 p, 1080 p, or 4K) have been found to have frequency components that overlap with the frequency bands used by conventional wireless communications technologies, referred to as the working frequencies of the wireless communications technologies. At certain resolutions and data rates, video processing system 708 and media connector 702 of media device 700 (as well as components of a connected display device) can generate RF radiation at frequencies within the common WIFI bandwidths of 2.4 GHz and 5 GHz. Such radiation can interfere with the performance of nearby wireless communication systems.

Media device 700 includes a wireless communication system, which is not shown in FIG. 7 and may be connected to a back surface of substrate 706. The wireless communication system is connected to an antenna 712 having two antenna feed structures 714 and 716. Feed structures 714 and 176 are each separately connected to the wireless communication system of media device 700 by signal lines. The wireless communication system is connected to first ends of the signal lines, while feed structures 714 and 716 are structures connected to the second, opposite, ends of the signal lines. In embodiments, impedance matching components may be coupled to the signal lines between feed structures 714 and 716 and the wireless communication system to provide impedance matching between feed structures 714 and 716 and the output of the wireless communication system.

By incorporating two separate feed structures 714 and 716 into a single antenna structure, device 700 only requires a single antenna potentially reducing the overall size and cost of device 700. In some embodiments, the length of device 700 may be reduced by up to or more than 14 mm as compared to devices incorporating two separate antennas.

Antenna 712 is mounted to substrate 706. Each of antenna feed structures 714 and 716 of antenna 712 are configured to transmit and receive RF signals through antenna 712 in a predetermined range of wireless communication frequencies or channels. For example, the wireless communication system may support 802.11a/b/g/n WIFI networks using 2.4 GHz and 5 GHz bands. Antenna feed structures 714 and 716 are positioned in antenna 712 to be orthogonal to one another, enabling the feed structures 714 and 716 to operate as two independent and isolated antennas with orthogonal polarization for the wireless communication system.

In various embodiments, the wireless communication system of media device 700 may transmit wireless signals through antenna 712 by transmitting RF signals to both antenna feed structures 714 and 716 simultaneously. But in some cases, the wireless communication system may only transmit or receive signals using a single antenna feed structure 714 or 716 at a time. For example, one of antenna feed structures 714 or 716 may experience a substantially better performance than the other antenna feed structure (e.g., a higher received signal strength indicator) in which case the wireless communication system may use that antenna feed structure primarily for communications—at least until detecting a change in received signal strength experienced by the antenna feed structures 714 and 716.

Antenna 712 is configured as patch antenna surface-mounted to substrate 706. Within antenna 712, a flat patch of conductive material is positioned over a dielectric or insulative material. The dielectric or insulative material is, in turn, positioned over a ground plane. An RF signal is applied to the antenna's patch via a signal lines connected to antenna feed structures 714 and 716. The antenna feed structures 714 and 716 electromagnetically couple RF signals to the patch 720 of antenna structure 712 that, in turn radiates a wireless transmission in accordance with the RF signal. Conversely, when a wireless signal impinges upon the conductive patch 720, patch 720 electromagnetically couples a corresponding electrical signal into antenna feed structures 714 and 716 that is communicated into the signal line that is electrically connected to the antenna feed structures 714 and 716. In this manner, antenna 712 operates as a patch antenna structure configured to simultaneously transmit and receive different RF signals communicated through the two separate feed structures 714 and 716. Feed structures 714 and 716 are connected to the wireless communication system via separate signal lines enabling the wireless communication system to transmit two different RF signals through feed structures 714 and 716 and, ultimately, the conductive patch 720 of antenna 712.

In an embodiment of media device 700, antenna feed structures 714 and 716 may be configured for communications over a first band (e.g., the 2.4 GHz band of WIFI). Such a media device 700 may include additional antennas (not shown), such as trace antennas, configured for communications using different band.

Conventional antennas typically exhibit asymmetric noise coupling (e.g., at the 2.4 GHz band). This can detrimentally affect wireless communications by both increasing false packet detection and reducing the effectiveness of maximum ratio combining, which can be a technique to increase communication system throughput. But in the configuration of antenna 712, antenna feed structures 714 and 716 are generally configured to exhibit symmetric noise coupling. This can improve wireless communication system performance by reducing false packet detection and enabling more effective maximum ratio combining.

Antenna 712 and feed structures 714 and 716 of antenna 712, are tuned so as to be most sensitive to wireless transmissions occurring within a particular bandwidth. For example, antenna feed structures 714 and 716 may be tuned specifically for communications occurring in the 2.4 GHz band for WIFI communications. In other embodiments, antenna feed structures 714 and 716 may be tuned for wireless communications occurring in the 2.4 or 5 GHz band for WIFI communications, though antenna feed structures 714 and 716 may be tuned for other communications frequencies or bandwidths. Antenna feed structures 714 and 716 may be tuned for communications in the same bandwidth or, in some cases, each of antenna feed structures 714 and 716 may be tuned for communications in different bands.

Antenna 712 includes conductive patch 720. Patch 720 includes a conductive material, such as aluminum or copper, mounted or laminated over dielectric material 722. Patch 720 is patterned with a series of notches or teeth and, optionally, may have chamfered corners to tune patch 720 to a desired operational frequency of the wireless communication system of device 700. In an embodiment, patch 720 may have a surface area of about 169 mm$^2$, in which patch 720 has a length and width of 13 mm. Again, however, in different implementations (e.g., in which the antennas are configured to radiate and receive signals having different frequencies), the geometry (e.g., the length, width, and depth) of patch 720 may be adjusted.

Antenna 712 and, consequently, antenna feed structures 714 and 716, may be electrically isolated from the other components of media device 700 by ground isolation region 730 of substrate 706. Ground isolation region 730, also referred to as a ground break or ground moat, generally includes a region of substrate 706 over which no electrical components, such as integrated circuits or discrete components, or traces are formed, with the exception of signal lines which form the connections between antenna feed structures 714 and 716 and the wireless communication system of device 700. Additionally, no electrical components, such as integrated circuits or discrete components, are electrically coupled to ground isolation region 730 and, as such, integrated circuits or discrete components mounted over or mounted to substrate 706 do not transfer electrical energy into ground isolation region 730 or, as described herein, across ground isolation region 730 of substrate 706. Specifically, no electrical components or traces are formed over either a top surface of ground isolation region 730, or a bottom surface of ground isolation region 730, again, with the exception of signal lines electrically coupled to antenna feed structures 714 and 716.

As illustrated in FIG. 7, substrate 706 includes a first end 706*a* and a second end 706*b*, opposite first end 706*a*. Antenna 712 is mounted to substrate 706 closer to end 706*a* than 706*b*. Conversely, media connector 702 is connected to substrate 706 closer to end 706*b* than 706*a*. Additionally, ground isolation region 730 is formed on or within substrate 706 closer to antenna 712 than media connector 702. Ground isolation region 730 provides for a minimum distance of separation between the device's antenna 712 and the other metal-containing and noise-generating components of media device 700. This physical separation can, to some degree, reduce an amount of noise that is conducted along substrate 706 from those components (e.g., video processing system 708) into antenna 712 and antenna feed structures 714 and 716. In some embodiments, if necessary, a ground connection may bridge across ground isolation region 740 to ensure substrate 706 on both sides of ground isolation region 740 have the same ground potential.

Ground isolation region 730 may be linear, extending directly across substrate 706, or may be non-linear so as to zig-zag or curve around a number of components mounted to a surface of substrate 706. Whether linear or non-linear, ground isolation region 730 has a minimum width that is maintained along the entire length of ground isolation region 730. Additionally, ground isolation region 730 extends from first edge 732 of substrate 706, across substrate 706, without interruption, to the opposite edge 734 of substrate 706. In this manner, ground isolation region 730 extends contiguously (i.e., without interruption or break) across the entire width of substrate 706.

In embodiments of media device 700, portions of ground isolation region 730 may in fact have a width that is greater than a particular minimum width, but ground isolation region 730 is formed so as to always have a width greater than or equal to the minimum width. In a typical implementation, that minimum width of ground isolation region 730 may be between 1 millimeter and 1.5 millimeters. But in other implementations, different minimum widths, such as minimum widths varying between 0.3 millimeters and 3 millimeters, may be utilized. Typically, the minimum width of ground isolation region 730 may be determined by the application of media device 700, with different media device 700 configurations requiring different minimum widths in order to achieve desired system performance.

As depicted in FIG. 7, antenna 712 is mounted to substrate 706 on a first side of substrate 706 from ground isolation region 730 and other components of media device 700 (e.g., video processing system 708 and media connector 702) are mounted on a second side of substrate 706.

Figure 8A:
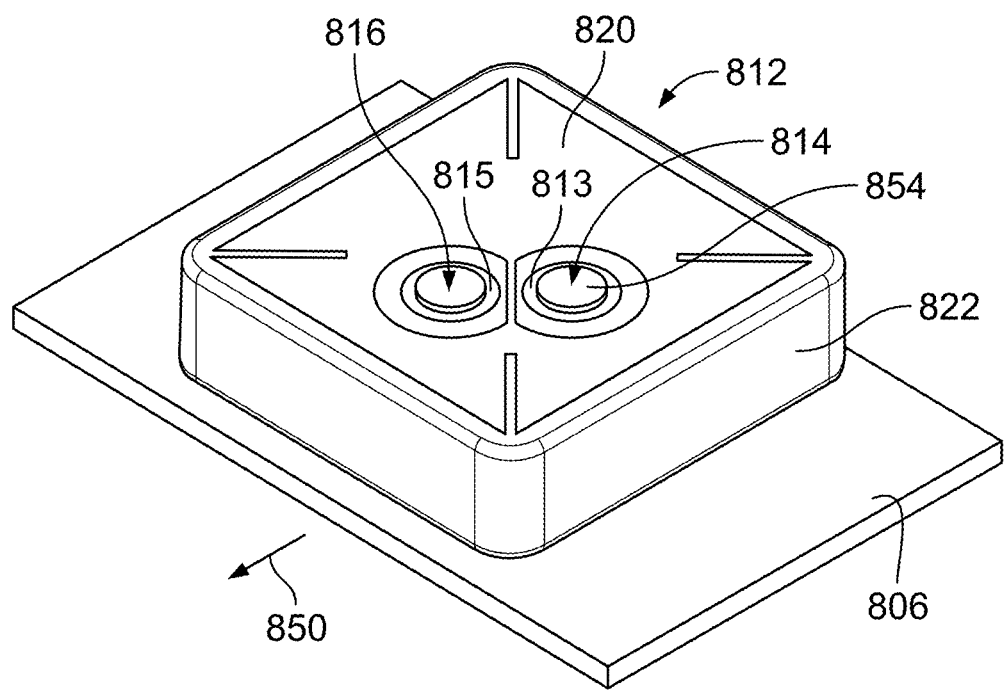
FIG. 8A is a perspective view of a patch antenna including antenna feed structures coplanar with the antenna's conductive patch.
Figure 8B:
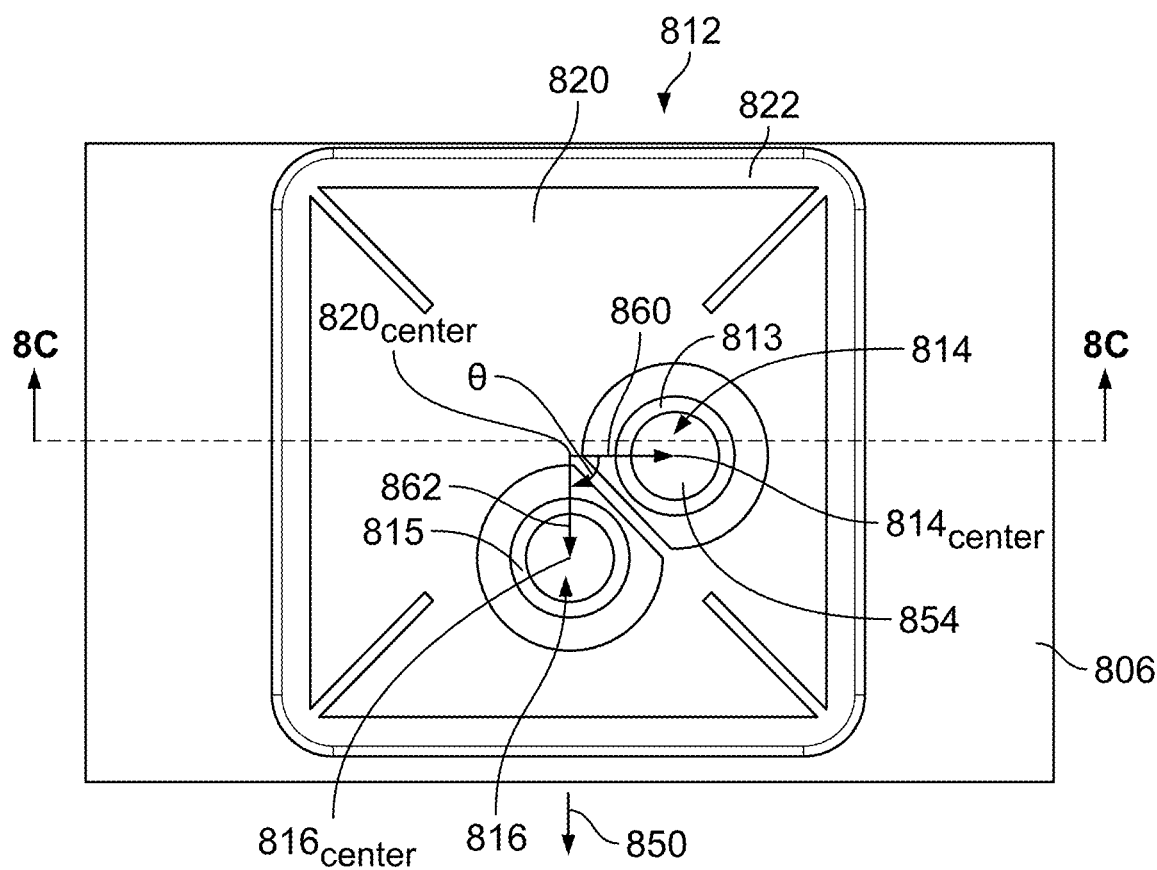
FIG. 8B is a top view of the antenna of FIG. 8A.
Figure 8C:
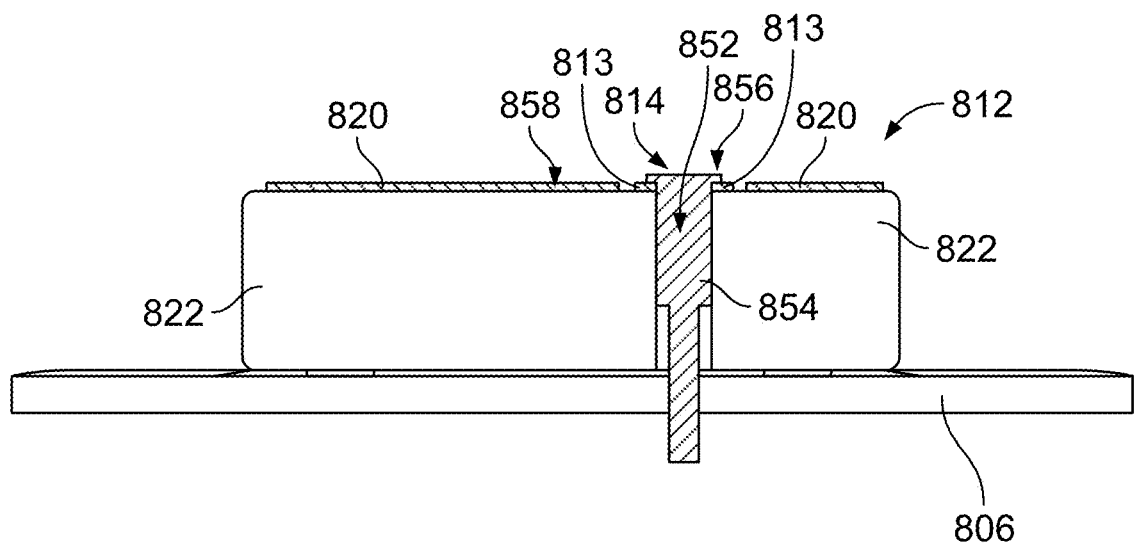
FIG. 8C is a cross-sectional view of the antenna of FIG. 8B taken along line 8C-8C of FIG. 8B.

In an embodiment of device 700, the feed structures of antenna 712 may arranged to be co-planar with the conductive patch 720 of antenna 712. To illustrate, FIGS. 8A-8C provide detailed views of antenna 812 that includes two antenna feed structures co-planar with the conductive patch of antenna 812. In various embodiments, antenna 812 may operate as the antenna of device 700 of FIG. 7. Accordingly, in an embodiment of device 700, antenna 712 may be implemented by an antenna having the configuration of antenna 812 depicted in FIGS. 8A-8C.

FIG. 8A is a perspective view of antenna 812 over substrate 806. FIG. 8B is a top view of antenna 812 over substrate 806. FIG. 8C is a cross-sectional view of antenna 812 taken along line 8C-8C of FIG. 8B. When antenna 812 is incorporated into device 700 of FIG. 7, antenna 812 is oriented so that arrow 850 shown in FIGS. 8A and 8B, points in a direction towards the location of media connector 702 of device 700. In other embodiments, antenna 812 may be rotated 90 degrees, 180 degrees, or 270 degrees with respect to substrate 806 from the orientation depicted in FIG. 8A.

Dielectric material 822 is mounted over substrate 806. Typically, dielectric material 822 includes a material such as ceramic with a relatively high dielectric constant that may range from 10-150. In a specific embodiment, the dielectric constant of dielectric material 822 may be 15 or greater (e.g., 20), for example. Such a configuration of dielectric material 822 may enable antenna 812 to be implemented with a smaller footprint with small form factor and may operate to further reduce noise coupling to the antenna. In embodiments, dielectric material 822 may have a similar or greater length and width to the geometry of patch 820 (e.g., length of 13 mm and width of 13 mm or greater). By incorporating a relatively high dielectric material into dielectric material 822, the electric fields generated by antenna feed structures 814 (analogous to feed structure 714 of FIGS. 7) and 816 (analogous to feed structure 716 of FIG. 7) within antenna 812 can be concentrated resulting in less ground current (e.g., to the device's HDMI port), which may result in reduced noise transmissions between antenna feed structures 814 and 816 and video processing system 708 of device 700, for example. Dielectric material 822 may be formed over substrate 806 using any suitable fabrication process. For example, dielectric material 822 could be applied in a liquid or semi-liquid or powder state and molded into the shape of dielectric material 822. Alternatively, dielectric material 822 may be fabricated as a solid block of dielectric material that is fastened or adhered (e.g., via a glue or adhesive) to a top surface of substrate 806.

While FIG. 8C shows a cross-section of feed structure 814, it should be understood that feed structure 816 has a similar structural arrangement as feed structure 814 and may be manufactured using a similar process. To form feed structure 814, a conductive feed ring 813 (a similar conductive feed ring 815 is formed as part of feed structure 816) is formed over the top surface 858 of dielectric material 822. Feed ring 813 may be formed using a similar deposition or plating process to that used to form patch 820. Feed ring 813 and patch 820 may be formed as part of the same manufacturing step so that both structures may be formed at substantially the same time. With feed ring 813 formed, an opening 852 is formed through feed ring 813, dielectric material 822, and substrate 806. Opening 852 may be formed by etching, mechanical drilling, molding of feed ring 813 and dielectric material 822, or any other suitable approach. With opening 852 formed, a conductive pin 854 is deposited or otherwise formed in opening 852. As illustrated, pin 854 is formed with a disc 856 at the top of pin 854 allowing disc 856 of pin 854 to rest upon feed ring 813 of dielectric material 822. Disc 856 in combination with feed ring 813 forms antenna feed structure 814 of antenna 812. Pin 854 and feed ring 813 may be electrically connected to one another via soldering or any other suitable technique for electrically connecting pin 854 to feed ring 813. In an embodiment, pin 854 and disc 856 are fabricated as a single conductive component that is inserted into opening 852. In another embodiment, pin 854 may be inserted into opening 852 first, and then disc 856 may be fabricated (e.g., via plating, laminating or another fabrication technique) over pin 854 and electrically connected (e.g., via soldering) to pin 854 and feed ring 813 to form feed structure 814. Pin 854, disc 856, and feed ring 813 may include any suitable conductive material, such as silver, gold, copper or aluminum.

As illustrated, pin 854 of antenna feed structure 814 extends through opening 852 in dielectric material 822 and through the opening 852 in substrate 806 at the bottom of antenna 812. The portion of pin 854 that extends through substrate 806 may be electrically connected to a signal line (not shown) to receive electrical signals from, for example, the wireless communication system of device 700. The signal line may contain components or otherwise operate to provide an impedance match between the output of the wireless communication system and antenna feed structure 814. A similar signal line in a similar manner may connect antenna feed structure 816 to the wireless communication system of device 700. The wireless communication system is configured to receive and decode signals received via antenna feed structure 814 and antenna feed structure 816. Once decoded, the data contained within such signals may be forwarded to other components of media device 700 (e.g., video processing system 708 or a system controller) for processing. Conversely, the wireless communication system may process signals received from other components of media device 700 to convert the signals into an appropriate signal for transmission via one or both of antenna feed structures 814 or 816.

Antenna feed structures 814 and 816 share a similar physical configuration and, as such, the construction of antenna feed structure 816 and manner of fabrication may be similar to the construction of antenna feed structure 814 depicted in FIG. 8C and the manner of construction described above.

Patch 820 is positioned over dielectric material 822. As described above, patch 820 has a specific geometry, which may include a pattern of slits and or chamfered corners configured to tune patch 820 to the desired operational frequency and sufficient bandwidth of antenna feed structures 814 and 816. As depicted in FIGS. 8A-8C, feed structures 814 and 816 and patch 820 are formed over the same top surface of dielectric material 822. Patch 820 is patterned so as to not be in direct physical contact with either of feed structures 814 or 816. In an embodiment, each of feed structures 814 and 816 may be separated from patch 820 by a minimum distance of 0.755 mm, though in various embodiments, different minimum separation distances may be implemented depending on the configuration and operational frequencies of feed structures 814 and 816 and patch 820.

During operation of antenna 812, feed structure 814 and feed structure 816 receive signals from the wireless communication system of device 700 through their respective signal lines. The signals received at each feed structure 814 and 816 may be the same or different. The signals received at the feed structures 814 and 816 electromagnetically couple to patch 820 and cause patch 820 to radiate a corresponding RF signal. In this manner, feed structures 814 and 816 may operate as two separate antennas for the wireless communication system.

Within antenna 812, feed structures 814 and 816, though similar constructed, are positioned so that the feed structures 814 and 816 are orthogonal to one another. Specifically, the antennas formed by the combination of patch 820 and each of feed structures 814 and 816 and the RF signals emitted from each feed structure 814 and 816 are orthogonal (i.e., orthogonally polarized) to one another.

Feed structures 814 and 816 are positioned within antenna 812 so that feed structures 814 and 816 are orthogonal to one another. Specifically, the orientations of feed structures 814 and 816 are offset from one another by 90 degrees.

With reference to FIG. 8B, the geometrical center of feed structure 814 ($814_{center}$) is offset from the geometrical center of patch 820 ($820_{center}$) as indicated by arrow 860. Similarly, the geometrical center of feed structure 816 (816$_{center}$) is offset from the geometrical center of patch 820 (820$_{center}$) as indicated by arrow 862. The angle θ between arrow 860 and arrow 862 is equal to 90 degrees. In this configuration, therefore, because feed structures 814 and 816 are the same distance from the center of patch 820, the position of feed structure 816 with respect to the center of patch 820 is rotationally offset from the position of feed structure 814 by 90 degrees. In these relative positions, feed 814 is orthogonal to feed 816.

To determine the placement of feed structures 814 and 186 with respect to patch 820, therefore, an initial position may be established for a first feed structure 814. The position for the second feed structure 816 can then be determined rotating the position of the first feed structure 814 by 90 degrees about the geometrical center of patch 820.

In still other embodiments, in which feed structure 814 and 816 may be implemented using different configurations than that depicted in FIGS. 8A-8C, different rotational offsets may be utilized to configure feed structures 814 and 816 to be orthogonal to one another.

In this orthogonal configuration, feed structures 814 and 816 in combination with metallic patch 820 are configured to each transmit signals through antenna 812 that are not detected or otherwise received by the other feed structure 814 or 816. Accordingly, when a signal is transmitted through feed structure 814 in combination with patch 820, because the antennas formed by feed structure 814 and feed structure 816 are orthogonally polarized to each other, feed structure 816 does not receive (e.g., is not sensitive to) the signal or the received signal has a negligible magnitude (e.g., equal to or less than a magnitude of observed noise) so that the signal can be ignored by the radio controller connected to feed structure 816. As such, arranging feed structures 814 and 816 to be orthogonal to one another and thereby transmit orthogonally polarized signals through patch 820 can reduce the likelihood that the feed structures 814 and 816 interfere with one another. Additionally, because the feed structures 814 and 816 are orthogonal to one another, this configuration can increase the likelihood that at least one of feed structures 814 and 816 can communicate successfully with an external wireless communication system.

In other embodiments of device 700, the feed structures may be positioned at different locations of antenna 712. To illustrate, FIGS. 9A-9D provide detailed views of antenna 912 that includes antenna feed structures disposed within an interior volume of the dielectric material of antenna 912. In various embodiments, antenna 912 may operate as the antenna of device 700 of FIG. 7. Accordingly, in an embodiment of device 700, antenna 712 may be replaced by an antenna having the configuration of antenna 912 depicted in FIGS. 9A-9C.

Figure 9A:
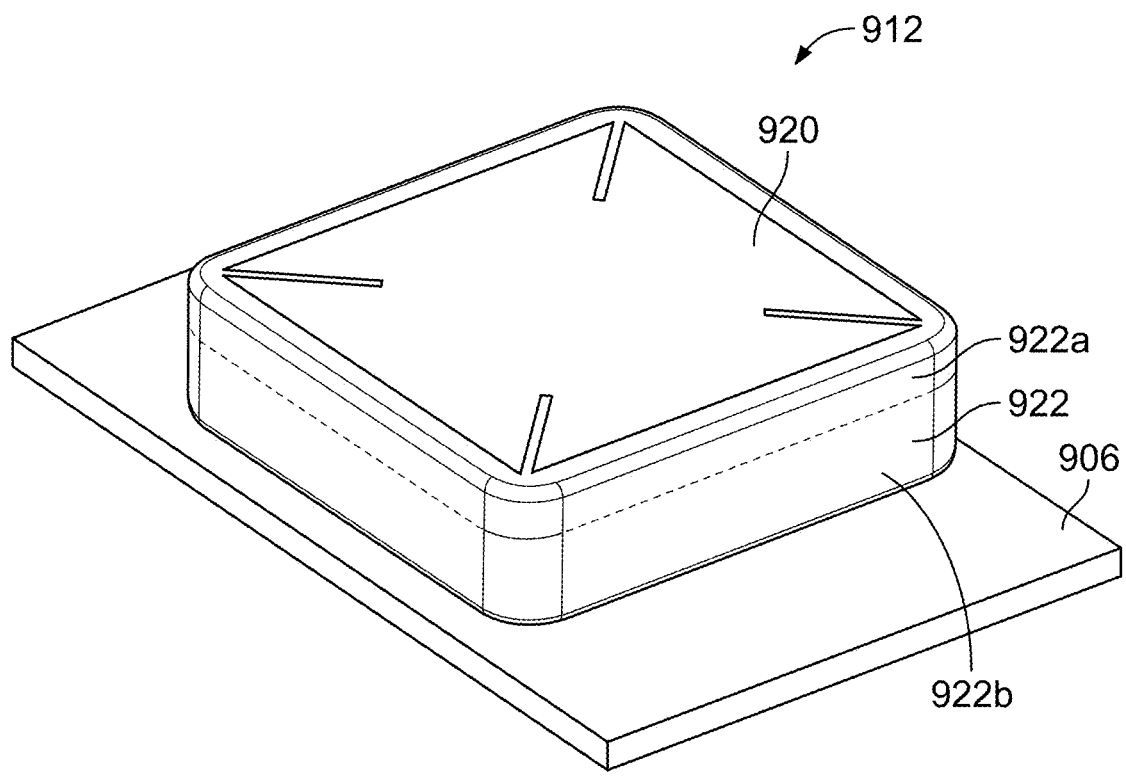
FIG. 9A is a perspective view of a patch antenna including antenna feed structures beneath the antenna's conductive patch.
Figure 9B:
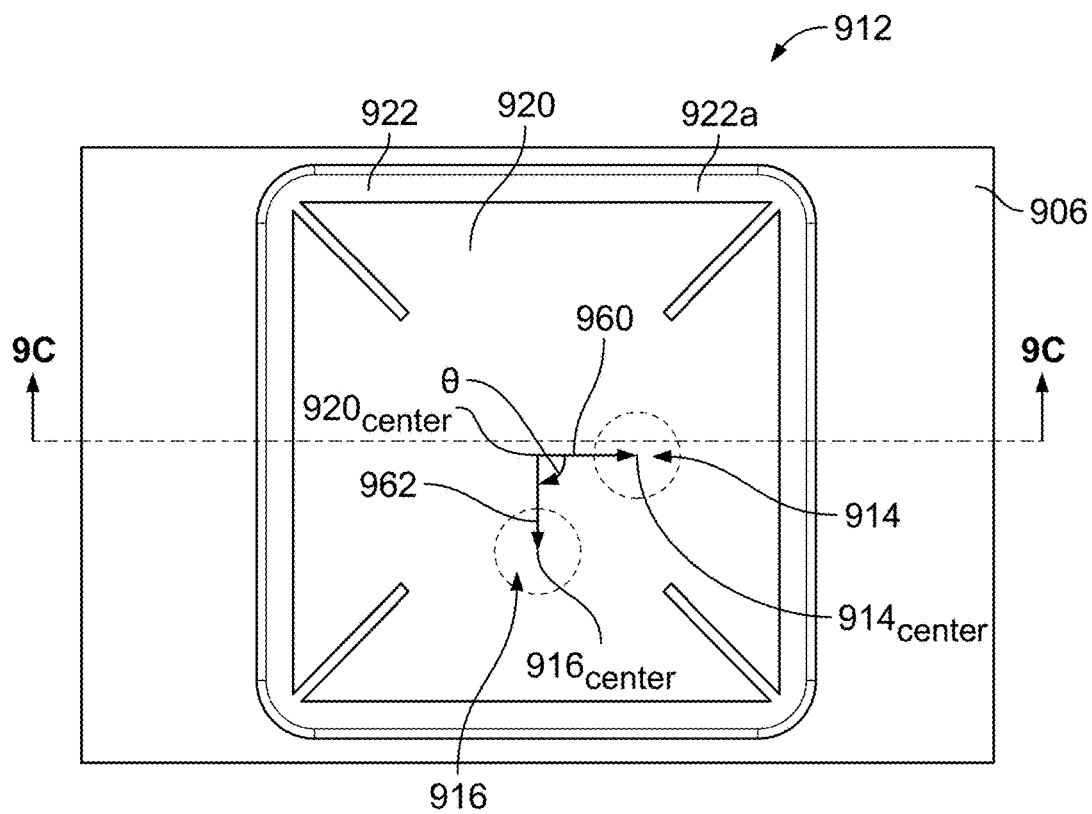
FIG. 9B is a top view of the antenna of FIG. 9A.
Figure 9C:
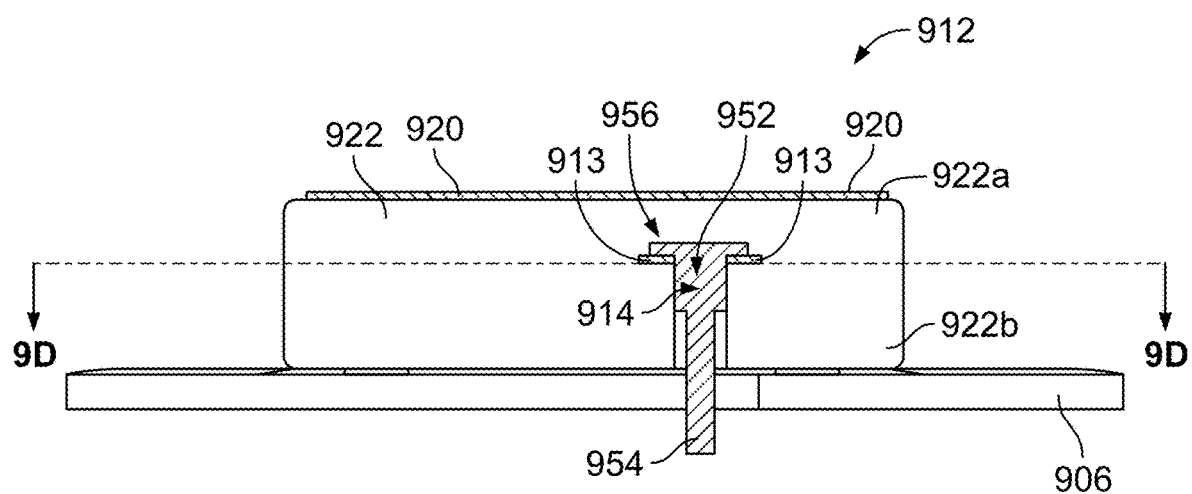
FIG. 9C is a cross-sectional view of the antenna of FIG. 9B taken along line 9C-9C of FIG. 9B.
Figure 9D:
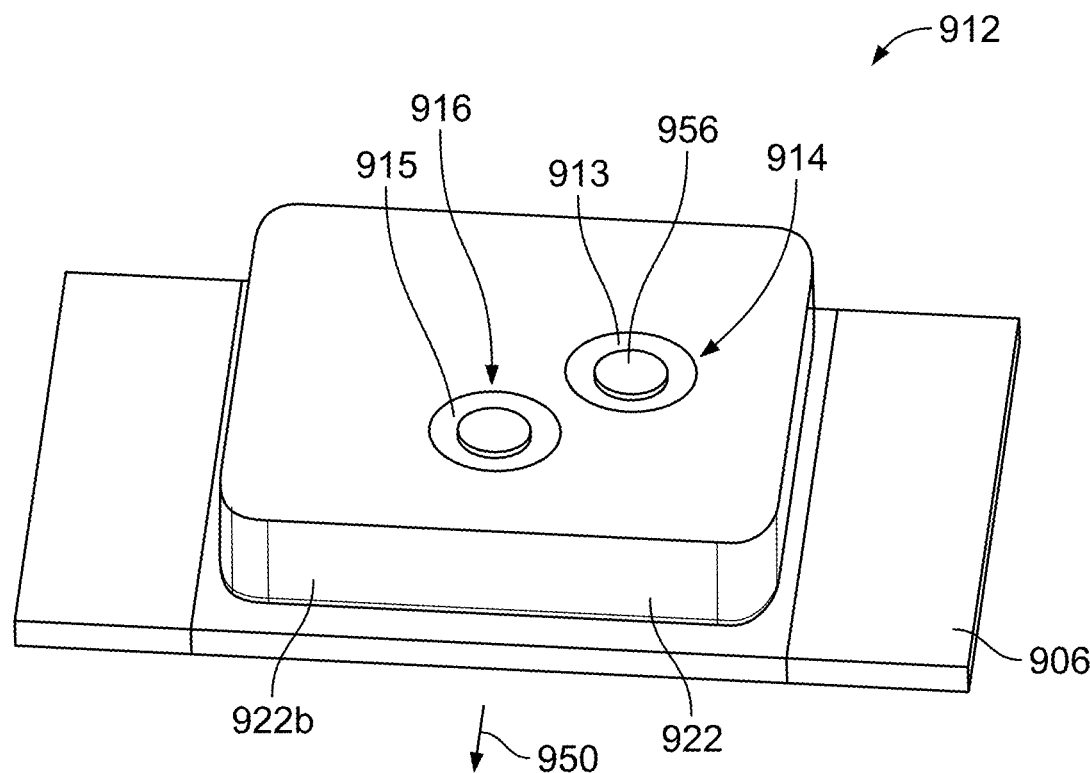
FIG. 9D is a cross-section view of the antenna of FIG. 9C taken along line 9D-9D of FIG. 9C.

FIG. 9A is a perspective view of antenna 912 over substrate 906. FIG. 9B is a top view of antenna 912 over substrate 906. FIG. 9C is a cross-sectional view of antenna 912 taken along line 9C-9C of FIG. 9B. FIG. 9D is a cross-section view of the antenna of FIG. 9C taken along line 9D-9D of FIG. 9C.

When antenna 912 is incorporated into device 700 of FIG. 7, antenna 912 is oriented so that arrow 950 shown in FIG. 9D, points in a direction towards the location of media connector 702 of device 700. In other embodiments, antenna 912 may be rotated 90 degrees, 180 degrees, or 270 degrees with respect to substrate 906 from the orientation depicted in FIG. 8A.

Dielectric material 922 is mounted over substrate 906. In this embodiment, dielectric material is made up of two sections 922a and 922b, as described below. Collectively, sections 922a and 922b of dielectric material will be referred to as dielectric material 922. Typically, dielectric material 922 includes a material such as ceramic with a relatively high dielectric constant that may range from 15-150. In a specific embodiment, the dielectric constant of dielectric material 922 may be 15 or greater (e.g., 20), for example. Such a configuration of dielectric material 922 may enable antenna 912 to be implemented with a smaller footprint with small form factor and may operate to further reduce noise coupling to the antenna In embodiments, dielectric material 922 may have a similar length and width to the geometry of patch 920 (e.g., length of 13 mm or greater and width of 13 mm or greater). By incorporating a relatively high dielectric material into dielectric material 922, the electric fields generated by antenna feed structures 914 (analogous to feed structure 714 of FIGS. 7) and 916 (analogous to feed structure 716 of FIG. 7) within antenna 912 can be concentrated resulting in less ground current (e.g., to the HDMI port of the device), which may result in reduced noise transmissions between antenna feed structures 914 and 916 and video processing system 708 of device 700, for example.

Sections 922a and 922b of dielectric material 922 may be formed over substrate 906 using any suitable fabrication process. For example, sections 922a and 922b could be applied in sequential liquid or semi-liquid or powder states and molded into the shapes of sections 922a and 922b of dielectric material 922. In this embodiment, dielectric material 922 may be formed by separately depositing two sections of dielectric material 922 over substrate 906. First, feed structures 914 and 916 may be mounted over section 922b of dielectric material 922. Section 922a of dielectric material 922 may then be mounted over section 922b and feed structures 914 and 916. The combined sections of dielectric material 922 may then be mounted over substrate 906. Section 922a of dielectric material 922 is then mounted over section 922b.

While FIG. 9C shows a cross-section of feed structure 914, it should be understood that feed structure 916 has a similar structural arrangement as feed structure 914 and may be manufactured using a similar process. To form feed structure 914, a conductive feed ring 913 (a similar conductive feed ring 915 is formed as part of feed structure 916) is formed over a top surface of section 922b of dielectric material 922. Feed ring 913 may be formed using a similar deposition or plating process to that used to form patch 920. Feed ring 913 and patch 920 may be formed as part of the same manufacturing step so that both structures may be formed at substantially the same time. With feed ring 913 formed, an opening 952 is formed through feed ring 913, section 922b of dielectric material 922, and substrate 906. Opening 952 may be formed by etching, mechanical drilling, molding of section 922b of feed ring 913 and dielectric material 922, or any other suitable approach. With opening 952 formed, a conductive pin 954 is deposited or otherwise formed in opening 952. As illustrated, pin 954 is formed with a disc 956 at the top of pin 954 allowing disc 956 of pin 954 to rest upon the top surface of feed ring 913 (see, for example, the cross-section of FIG. 9D). Disc 956 in combination with feed ring 913 forms antenna feed structure 914 of antenna 912. Pin 954 and feed ring 913 may be electrically connected to one another via soldering or any other suitable technique for electrically connecting pin 954 to feed ring 913. In an embodiment, pin 954 and disc 956 are fabricated as a single conductive component that is inserted into opening 952 as illustrated in FIG. 9C. In another embodiment, pin 954 may be inserted into opening 952 first, and then disc 956 may be fabricated (e.g., via plating, laminating or another fabrication technique) over pin 954 and electrically connected (e.g., via soldering) to pin 954 and feed ring 913 to form feed structure 914. Pin 954, disc 956, and feed ring 913 may include any suitable conductive material, such as silver, gold, copper or aluminum.

With feed structures 914 and 916 formed, section 922a of dielectric material 922 is deposited over section 922b. Section 922a may be joined to section 922b using a low-loss or non-conductive glue or adhesive, for example.

As illustrated, pin 954 of antenna feed structure 914 extends through opening 952 in section 922b of dielectric material 922 and through the opening 952 in substrate 906. The portion of pin 954 that extends through substrate 906 may be electrically connected to a signal line (not shown) to receive electrical signals from, for example, the wireless communication system of device 700. The signal line may contain components to provide an impedance match between the output of the wireless communication system and antenna feed structure 914. A similar signal line in a similar manner may connect antenna feed structure 916 to the wireless communication system of device 700. The wireless communication system is configured to receive and decode signals received via antenna feed structure 914 and antenna feed structure 916. Once decoded, the data contained within such signals may be forwarded to other components of media device 700 (e.g., video processing system 708 or a system controller) for processing. Conversely, the wireless communication system may process signals received from other components of media device 700 to convert the signals into an appropriate signal for transmission via one or both of antenna feed structures 914 or 916.

Antenna feed structures 914 and 916 share a similar physical configuration and, as such, the construction of antenna feed structure 916 and manner of fabrication may be similar to the construction of antenna feed structure 914 depicted in FIGS. 9C and 9D and the manner of construction described above.

Patch 920 is positioned over dielectric material 922. As described above, patch 920 has a specific geometry, which may include a pattern of slits and or chamfered corners configured to tune patch 920 to the desired operational frequency and sufficient bandwidth of antenna feed structures 914 and 916. As depicted in FIGS. 9A-9D, feed structures 914 and 916 are located underneath patch 920 and so are not in direct physical contact with patch 920. Specifically, portions of section 922a of dielectric material 922 separate each of feed structures 914 and 916 from patch 920. In an embodiment, the thickness of section 922a of dielectric material 922 is about 1 mm (e.g., 1.3 mm) so that feed structures 914 and 916 are physically separated from patch 920 by about 1 mm. In this configuration, section 922b of dielectric material 920 has a thickness of about 3 mm.

During operation of antenna 912, feed structure 914 and feed structure 916 receive signals from the wireless communication system of device 700 through their respective signal lines. The signals received at each feed structure 914 and 916 may be the same or different. The signal received at the feed structures 914 and 916 electromagnetically couple to patch 920 and cause patch 920 to radiate a corresponding RF signal. In this manner, feed structures 914 and 916 may operate as two separate antennas for the wireless communication system.

Within antenna 912, feed structures 914 and 916, though similar constructed, are positioned so that the feed structures 914 and 916 are orthogonal to one another. Specifically, the antennas formed by the combination of patch 920 and each of feed structures 914 and 916 and the RF signals emitted from each feed structure 914 and 916 are orthogonally polarized to one another.

With reference to the top view of antenna 912 shown in FIG. 9B, the positions of feed structures 914 and 916 underneath patch 920 are illustrated using dashed lines. As illustrated, the positions of feed structures 914 and 916 within antenna 912 are rotationally offset from one another by 90 degrees.

With reference to FIG. 9B, in the plane established by patch 920, the geometrical center of feed structure 914 ($914_{center}$), when projected upwards onto patch 920, is offset from the geometrical center of patch 920 ($920_{center}$) as indicated by arrow 960. Similarly, the geometrical center of feed structure 916 ($916_{center}$), when projected upwards onto patch 920, is offset from the geometrical center of patch 920 ($920_{center}$) as indicated by arrow 962. The angle $\theta$ between arrow 960 and arrow 962 is equal to 90 degrees. In this configuration, therefore, the position of feed structure 916 is rotationally offset about an axis running through and orthogonal to the center of patch 920 from the position of feed structure 914 by 90 degrees.

To determine the placement of feed structures 914 and 916 within antenna 912, therefore, an initial position may be established for a first feed structure 914. The position for the second feed structure 916 can then be determined rotating the position of the first feed structure 914 by 90 degrees about an axis running through and orthogonal to the geometrical center of patch 920.

In still other embodiments, in which feed structure 914 and 916 may be implemented using different configurations than that depicted in FIGS. 9A-9D, different rotational offsets may be utilized to make feed structures 914 and 916 orthogonal to one another to cause feed structures 914 and 916, in combination with patch 920, to form orthogonally polarized antennas.

In this orthogonal configuration, feed structures 914 and 916 in combination with patch 920 are configured to each transmit signals through antenna 912 that are not detected or otherwise received by the other feed structure 914 or 916. Accordingly, when a signal is transmitted through feed structure 914 in combination with patch 920, feed structure 916 does not receive (e.g., is not sensitive to) the signal or the received signal has a negligible magnitude (e.g., equal to or less than a magnitude of observed noise) so that the signal can be ignored by the radio controller connected to feed structure 916. As such, arranging feed structures 914 and 916 to be orthogonal and transmit orthogonally polarized signals through patch 920 can reduce the likelihood that the feed structures 914 and 916 interfere with one another. Additionally, because the feed structures 914 and 916 are orthogonal to one another, this configuration can increase the likelihood that at least one of feed structures 914 and 916 can communicate successfully with an external wireless communication system.

Figure 10A:
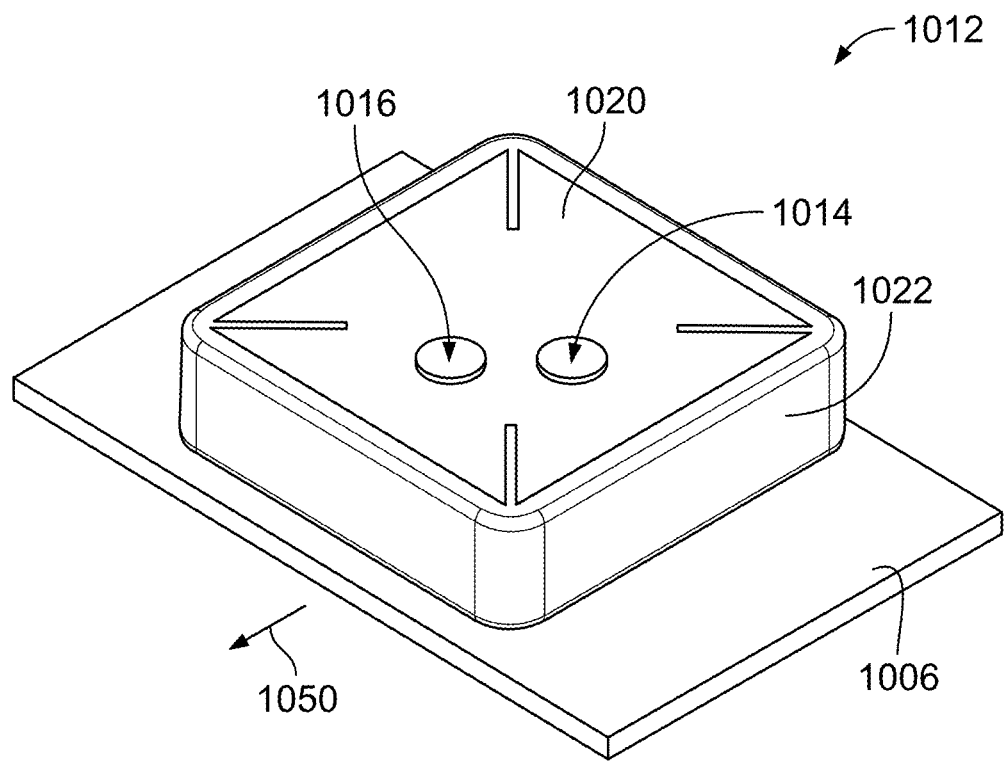
FIG. 10A is a perspective view of a patch antenna including antenna feed structures above the antenna's conductive patch.
Figure 10B:
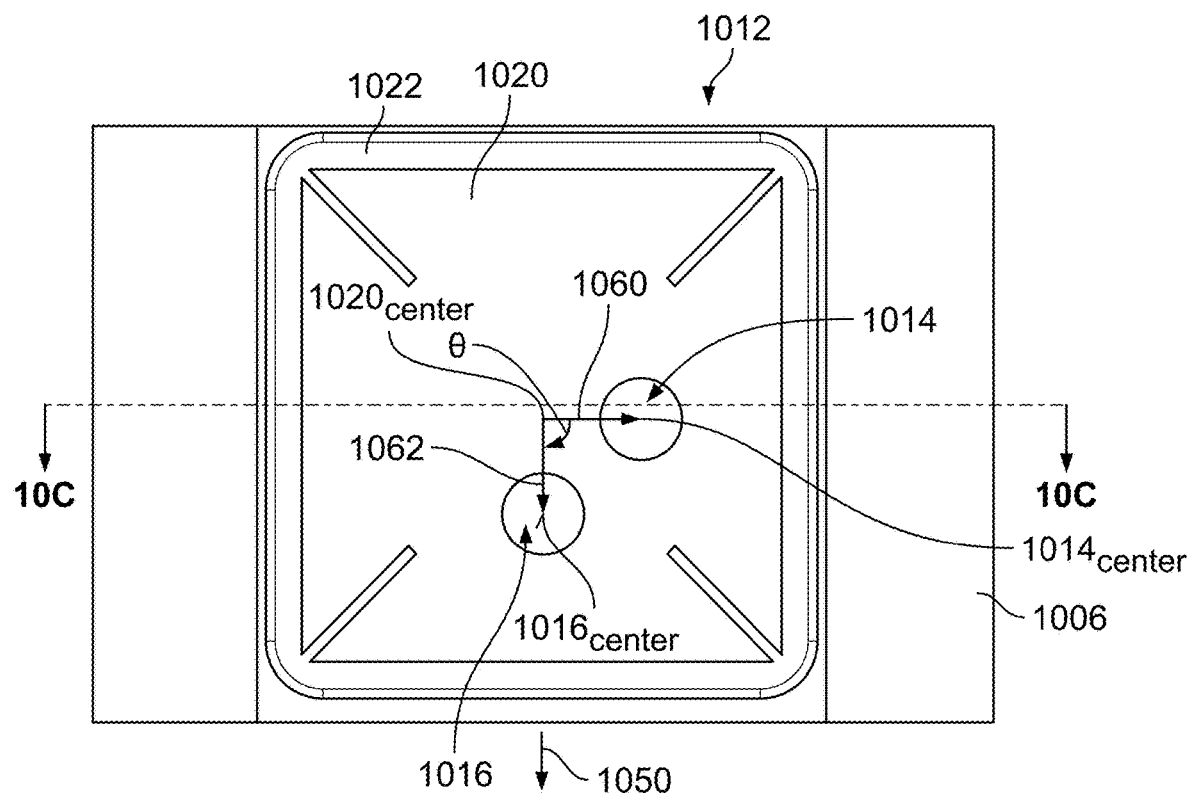
FIG. 10B is a top view of the antenna of FIG. 10A.
Figure 10C:
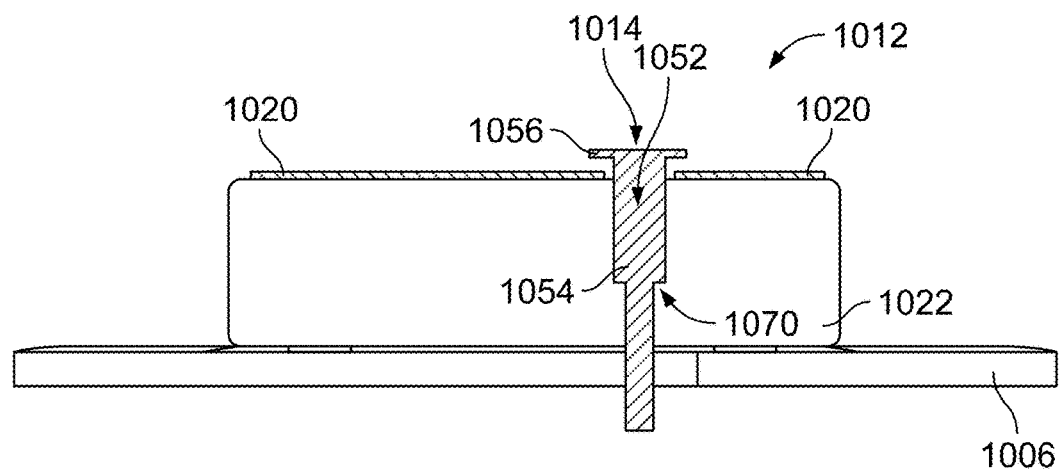
FIG. 10C is a cross-sectional view of the antenna of FIG. 10B taken along line 10C-10C of FIG. 10B.

In another embodiment, device 700 may include a patch antenna that includes feed structures positioned above the dielectric material of the antenna. To illustrate, FIGS. 10A-10C provide detailed views of antenna 1012 that includes two antenna feed structures disposed above the dielectric material of antenna 1012. In various embodiments, antenna 1012 may operate as the antenna of device 700 of FIG. 7. Accordingly, in an embodiment of device 700, antenna 712 may be replaced by an antenna having the configuration of antenna 1012 depicted in FIGS. 10A-10C.

FIG. 10A is a perspective view of antenna 1012 over substrate 1006. FIG. 10B is a top view of antenna 1012 over substrate 1006. FIG. 10C is a cross-sectional view of antenna 1012 taken along line 10C-10C of FIG. 10B. When antenna 1012 is incorporated into device 700 of FIG. 7, antenna 1012 is oriented so that arrow 1050 shown in FIGS. 10A and 10B, points in a direction towards the location of media connector 702 of device 700. In other embodiments, antenna 1012 may be rotated 90 degrees, 180 degrees, or 270 degrees with respect to substrate 1006 from the orientation depicted in FIG. 8A.

Dielectric material 1022 is mounted over substrate 1006. Typically, dielectric material 1022 includes a material such as ceramic with a relatively high dielectric constant that may range from 15-150. In a specific embodiment, the dielectric constant of dielectric material 1022 may be 15 or greater (e.g., 20), for example. Such a configuration of dielectric material 1022 may enable antenna 1012 to be implemented with a smaller footprint with small form factor and may operate to further reduce noise coupling to the antenna In embodiments, dielectric material 1022 may have a similar length and width to the geometry of patch 1020 (e.g., length of 13 mm or greater and width of 13 mm or greater). By incorporating a relatively high dielectric material into dielectric material 1022, the electric fields generated by antenna feed structures 1014 (analogous to feed structure 714 of FIGS. 7) and 1016 (analogous to feed structure 716 of FIG. 7) within antenna 1012 can be concentrated resulting in less ground current (e.g., to the device's HDMI port), which may result in reduced noise transmissions between antenna feed structures 1014 and 1016 and video processing system 708 of device 700, for example.

Dielectric material 1022 may be formed over substrate 1006 using any suitable fabrication process. For example, dielectric material 1022 could be applied in a liquid or semi-liquid or powder state and molded into the shape of dielectric material 1022. Alternatively, dielectric material 1022 may be fabricated as a solid block of dielectric material that is fastened or adhered (e.g., via a glue or adhesive) to a top surface of substrate 1006.

While FIG. 10C shows a cross-section of feed structure 1014, it should be understood that feed structure 1016 has a similar structural arrangement as feed structure 1014 and may be manufactured using a similar process. To form feed structure 1014, an opening 1052 is formed through patch 1020, dielectric material 1022, and substrate 1006 for mounting patch antenna on PCB. Opening 1052 may be formed by etching, mechanical drilling, molding of dielectric material 1022, or any other suitable approach. With opening 1052 formed, a conductive pin 1054 is deposited or otherwise formed in opening 1052. As illustrated, pin 1054 is formed with a disc 1056 at the top of pin 1054. Disc 1056 forms antenna feed structure 1014 of antenna 1012. In an embodiment, pin 1054 and disc 1056 are fabricated as a single conductive component that is inserted into opening 1052. In another embodiment, pin 1054 may be inserted into opening 1052 first, and then disc 1056 may be fabricated (e.g., via plating, laminating or another fabrication technique) over pin 1054 and electrically connected (e.g., via soldering) to pin 1054. Pin 1054 and disc 1056 may include any suitable conductive material, such as copper, silver, gold or aluminum.

Pin 1054 may be retained within opening 1052 in any suitable manner to prevent pin 1054 from moving through opening 1052 lengthwise or rotating within opening 1052. For example, a portion of pin 1054 may engage with a step 1070 or other structure fabricated within opening 1052 to prevent pin 1054 from passing all the way through opening 1052. Similar structures may be implemented within opening 1052 to prevent rotation of pin 1054. Pin 1054 may also be attached or adhered to a portion of opening 1052 or another structure of antenna 1012 via soldering to prevent movement of pin 1054 with respect to antenna 1012. In some cases, a non-conductive structure may be positioned between the underside of disc 1056 and the top surface of patch 1020. Disc 1056 may then rest upon the non-conductive structure. In this configuration, antenna feed structure 1014 (i.e., disc 1056) is suspended above the surface of patch 1020 by a distance of approximately half a millimeter (in a specific embodiment, the distance is 0.6 mm).

As illustrated, pin 1054 of antenna feed structure 1014 extends through opening 1052 in dielectric material 1022 and through the opening 1052 in substrate 1006. The portion of pin 1054 that extends through substrate 1006 may be electrically connected to a signal line (not shown) to receive electrical signals from, for example, the wireless communication system of device 700. The signal line may contain components to provide an impedance match between the output of the wireless communication system and antenna feed structure 1014. A similar signal line in a similar manner may connect antenna feed structure 1016 to the wireless communication system of device 700. The wireless communication system is configured to receive and decode signals received via antenna feed structure 1014 and antenna feed structure 1016. Once decoded, the data contained within such signals may be forwarded to other components of media device 700 (e.g., video processing system 708 or a system controller) for processing. Conversely, the wireless communication system may process signals received from other components of media device 700 to convert the signals into an appropriate signal for transmission via one or both of antenna feed structures 1014 or 1016.

Antenna feed structures 1014 and 1016 share a similar physical configuration and, as such, the construction of antenna feed structure 1016 and manner of fabrication may be similar to the construction of antenna feed structure 1014 depicted in FIG. 10C and the manner of construction described above.

Patch 1020 is positioned over dielectric material 1022. As described above, patch 1020 has a specific geometry, which may include a pattern of slits and or chamfered corners configured to tune patch 1020 to the desired operational frequency and sufficient bandwidth of antenna feed structures 1014 and 1016.

During operation of antenna 1012, feed structure 1014 and feed structure 1016 receive signals from the wireless communication system of device 700 through their respective signal lines. The signals received at each feed structure 1014 and 1016 may be the same or different. The signals received at the feed structures 1014 and 1016 electromagnetically couple to patch 1020 and cause patch 1020 to radiate a corresponding RF signal. In this manner, feed structures 1014 and 1016 in combination with patch 1020 may operate as two separate antennas for the wireless communication system.

Within antenna 1012, feed structures 1014 and 1016, though similar constructed, are positioned so that the feed structures 1014 and 1016 are orthogonal to one another. Specifically, the antennas formed by the combination of patch 1020 and each of feed structures 1014 and 1016 and the RF signals emitted from each feed structure 1014 and 1016 are orthogonal (i.e., orthogonally polarized) to one another.

With reference to the top view of antenna 1012 shown in FIG. 10B, feed structures 1014 and 1016 are positioned so that feed structures 1014 and 1016 are orthogonal to one another. Specifically, the orientations of feed structures 1014 and 1016 are offset from one another by 90 degrees.

With reference to FIG. 10B, the geometrical center of feed structure 1014 (1014$_{center}$) is offset from an axis orthogonal to the geometrical center of patch 1020 (1020$_{center}$) as indicated by arrow 1060. Similarly, the geometrical center of feed structure 1016 (1016$_{center}$) is offset from an axis orthogonal to the geometrical center of patch 1020 (1020$_{center}$) as indicated by arrow 1062. The angle θ between arrow 1060 and arrow 1062 is equal to 90 degrees. In this configuration, therefore, the position of feed structure 1016 with respect to 1020$_{center}$ is rotationally offset from the position of feed structure 1014 by 90 degrees.

To determine the placement of feed structures 1014 and 1016, therefore, an initial position may be established for a first feed structure 1014. The position for the second feed structure 1016 can then be determined rotating the position of the first feed structure 1014 by 90 degrees about the vertical axis running through the geometrical center of patch 1020.

In still other embodiments, in which feed structure 1014 and 1016 may be implemented using different configurations than that depicted in FIGS. 10A-10C, different rotational offsets may be utilized to position feed structures 1014 and 1016 to be orthogonal to one another and generate orthogonally polarized antennas in combination with patch 1020.

In this orthogonal configuration, feed structures 1014 and 1016 in combination with patch 1020 are configured to each transmit signals through antenna 1012 that are not detected or otherwise received by the other feed structure 1014 or 1016. Accordingly, when a signal is transmitted through feed structure 1014 in combination with patch 1020, feed structure 1016 does not receive (e.g., is not sensitive to) the signal or the received signal has a negligible magnitude (e.g., equal to or less than a magnitude of observed noise) so that the signal can be ignored by the radio controller connected to feed structure 1016. As such, configuring feed structures 1014 and 1016 to be orthogonal to one another can reduce the likelihood that the feed structures 1014 and 1016 interfere with one another. Additionally, because the feed structures 1014 and 1016 are orthogonal to one another, this configuration can increase the likelihood that at least one of feed structures 1014 and 1016 can communicate successfully with an external wireless communication system.

Figure 11:
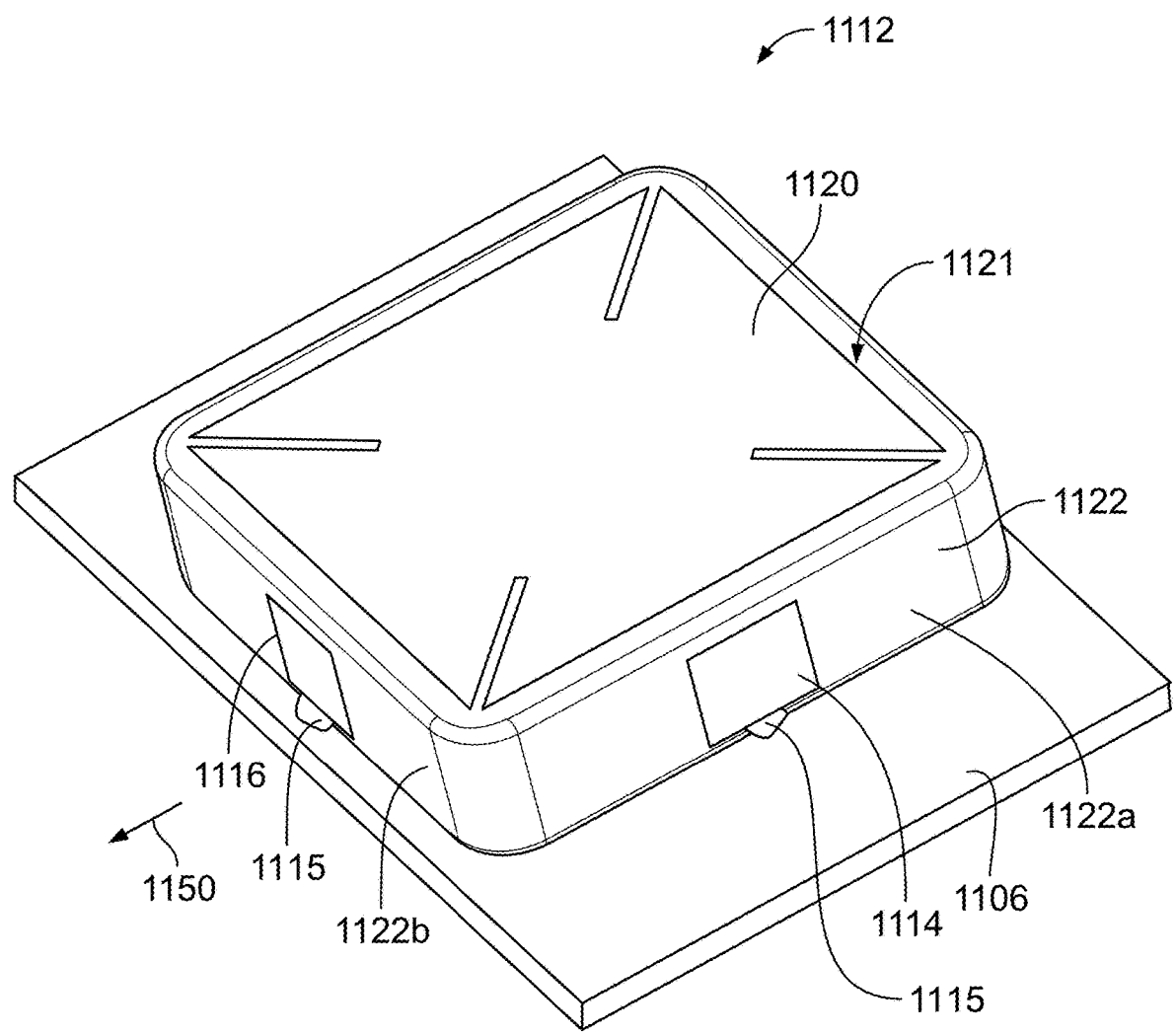
FIG. 11 is a perspective view of a patch antenna including antenna feed structures on sidewalls of the antenna's dielectric material.

In another embodiment, device 700 may include a patch antenna that includes feed structures positioned on sidewalls of the dielectric material of the antenna. To illustrate, FIG. 11 provides a detailed perspective view of antenna 1112 that includes two antenna feed structures disposed on sidewalls of the dielectric material of antenna 1112. In various embodiments, antenna 1112 may operate as the antenna of device 700 of FIG. 7. Accordingly, in an embodiment of device 700, antenna 712 may be replaced by an antenna having the configuration of antenna 1112 depicted in FIG. 11.

When antenna 1112 is incorporated into device 700 of FIG. 7, antenna 1112 is oriented so that arrow 1150 shown in FIG. 11, points in a direction towards the location of media connector 702 of device 700. In other embodiments, antenna 1112 may be rotated 90 degrees, 180 degrees, or 270 degrees with respect to substrate 1106 from the orientation depicted in FIG. 8A.

Dielectric material 1122 is mounted over substrate 1106. Typically, dielectric material 1122 includes a material such as ceramic with a relatively high dielectric constant that may range from 15-150. In a specific embodiment, the dielectric constant of dielectric material 1122 may be 15 or greater (e.g., 20), for example. Such a configuration of dielectric material 1122 may enable antenna 1112 to be implemented with a smaller footprint with small form factor and may operate to further reduce noise coupling to the antenna In embodiments, dielectric material 1122 may have a similar length and width to the geometry of patch 1120 (e.g., length of 13 mm or greater and width of 13 mm or greater). By incorporating a relatively high dielectric material into dielectric material 1122, the electric fields generated by antenna feed structures 1114 (analogous to feed structure 714 of FIGS. 7) and 1116 (analogous to feed structure 716 of FIG. 7) within antenna 1112 can be concentrated resulting in less ground current (e.g., to the device's HDMI port), which may result in reduced noise transmissions between antenna feed structures 1114 and 1116 and video processing system 708 of device 700, for example.

Dielectric material 1122 may be formed over substrate 1106 using any suitable fabrication process. For example, dielectric material 1122 could be applied in a liquid or semi-liquid or powder state and molded into the shape of dielectric material 1122. Alternatively, dielectric material 1122 may be fabricated as a solid block of dielectric material that is fastened or adhered (e.g., via a glue or adhesive) to a top surface of substrate 1106.

Dielectric material 1122 includes a top surface 1121 and an opposing bottom surface. Top surface 1121 is separated from the bottom surface of dielectric material 1122 by a distance.

Feed structure 1114 is formed over a first sidewall 1122a of dielectric material 1122. Sidewall 1122a extends from top surface 1121 to the bottom surface of dielectric material 1122. Feed structure 1114 includes a conductive material such as copper, silver, or aluminum and may be formed by plating or adhering feed structure 1114 to the first sidewall of dielectric material 1122. Feed structure 1116 is formed over a second sidewall 1122b of dielectric material 1122. Sidewall 1122b extends from top surface 1121 to the bottom surface of dielectric material 1122. Feed structure 1116 includes a conductive material such as copper, silver, or aluminum and may be formed by plating or adhering feed structure 1116 to the second sidewall of dielectric material 1122.

Each of feed structures 1114 and 1116 are connected to signal lines (not shown) to electrically couple each feed structure 1114 and 1116 to the wireless communication system of device 700. In an embodiment, feed structures 1114 and 1116 are connected to the signal lines via solder bumps 1115 or other electrical connections that electrically connect feed structures 1114 and 1116 to the signal lines. The signal lines in combination with any matching components may operate to provide an impedance match between the output of the wireless communication system and antenna feed structures 1114 and 1116.

Patch 1120 is positioned over dielectric material 1122. As described above, patch 1120 has a specific geometry, which may include a pattern of slits and or chamfered corners configured to tune patch 1120 to the desired operational frequency and sufficient bandwidth of antenna feed structures 1114 and 1116. Patch 1120 includes a conductive material, such as copper, silver, or aluminum and may be laminated, printed, or otherwise adhered to the top surface of dielectric material 1122.

During operation of antenna 1112, feed structure 1114 and feed structure 1116 receive signals from the wireless communication system of device 700 through their respective signal lines. The signals received at each feed structure 1114 and 1116 may be the same or different. The signals received at the feed structures 1114 and 1116 electromagnetically couple to patch 1120 and cause patch 1120 to radiate a corresponding RF signal. In this manner, feed structures 1114 and 1116 may operate as two separate antennas for the wireless communication system.

Within antenna 1112, feed structures 1114 and 1116, though similar constructed, are positioned so that the feed structures 1114 and 1116 are orthogonal to one another. Specifically, feed structures 1114 and 1116 are mounted to sidewalls of dielectric material 1122 that are orthogonal (i.e., at right angles) to one another. In this configuration, the antennas formed by the combination of patch 1120 and each of feed structures 1114 and 1116 and the RF signals emitted from each feed structure 1114 and 1116 in combination with patch 1120 are orthogonal (i.e., orthogonally polarized) to one another.

In this orthogonal configuration, feed structures 1114 and 1116 in combination with metallic patch 1120 are configured to each transmit signals through antenna 1112 that are not detected or otherwise received by the other feed structure 1114 or 1116. Accordingly, when a signal is transmitted through feed structure 1114 and patch 1120, feed structure 1116 does not receive (e.g., is not sensitive to) the signal or the received signal has a negligible magnitude (e.g., equal to or less than a magnitude of observed noise) so that the signal can be ignored by the radio controller connected to feed structure 1116. As such, arranging feed structures 1114 and 1116 to be orthogonal to one another can reduce the likelihood that the feed structures 1114 and 1116 interfere with one another. Additionally, because the feed structures 1114 and 1116 are orthogonal to one another, this configuration can increase the likelihood that at least one of feed structures 1114 and 1116 can communicate successfully with an external wireless communication system.

Figure 3A:
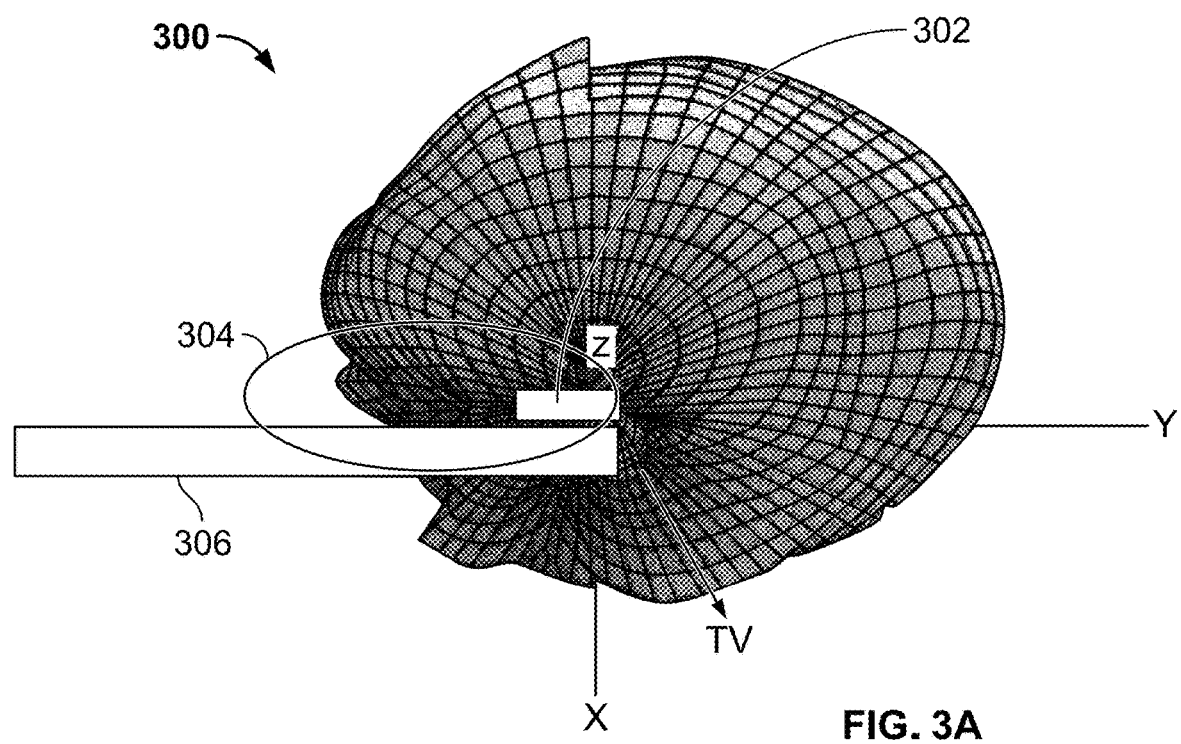
FIG. 3A is a plot depicting a radiation pattern for an antenna configured in accordance with the design of antennas depicted in FIGS. 1A, 1B, and 2 at a frequency of 2.4 GHz.

In the antenna configurations depicted in FIGS. 1A, 1B, 2, 7, 8A-8C, 9A-9D, 10A-10C, and 11, antennas 112, 114, 712, 812, 912, 1012, and 1112 are configured to operate as at least partially directional antennas, where the antennas demonstrate reduced sensitivity in a direction of the device's noise-generating components. To illustrate this configuration, FIG. 3A is a plot depicting the radiation pattern 300 for an antenna 302 configured in accordance with the patch antenna design of antennas 112, 114, 712, 812, 912, 1012, and 1112 depicted in FIGS. 1A, 1B, 2, 7, 8A-8C, 9A-9D, 10A-10C, and 11 at a frequency of 2.4 GHz. Conversely, FIG. 3B is a plot depicting the radiation pattern 350 for a conventional antenna 352 at 2.4 GHz (e.g., a trace antenna).

As seen in FIG. 3A, the radiation pattern 300 for antenna 302 has a region 304 in which antenna 302 exhibits reduced radiation and is, therefore, less sensitive in a direction oriented towards region 304. As shown in FIG. 3A that particular direction is oriented back towards the substrate 306 over which antenna 302 is mounted. When incorporated into a media device, such as media device 100, therefore, antenna 302 (e.g., antenna 112, 114, 712, 812, 912, 1012, or 1112) would exhibit reduced sensitivity in the direction of the noise-generating components of the media device (e.g., video processing system 108 of FIGS. 1A, 1B or video processing system 708 of FIG. 7). This renders antenna 302 less likely to absorb or otherwise pickup noise generated and/or radiated by those components.

Figure 3B:
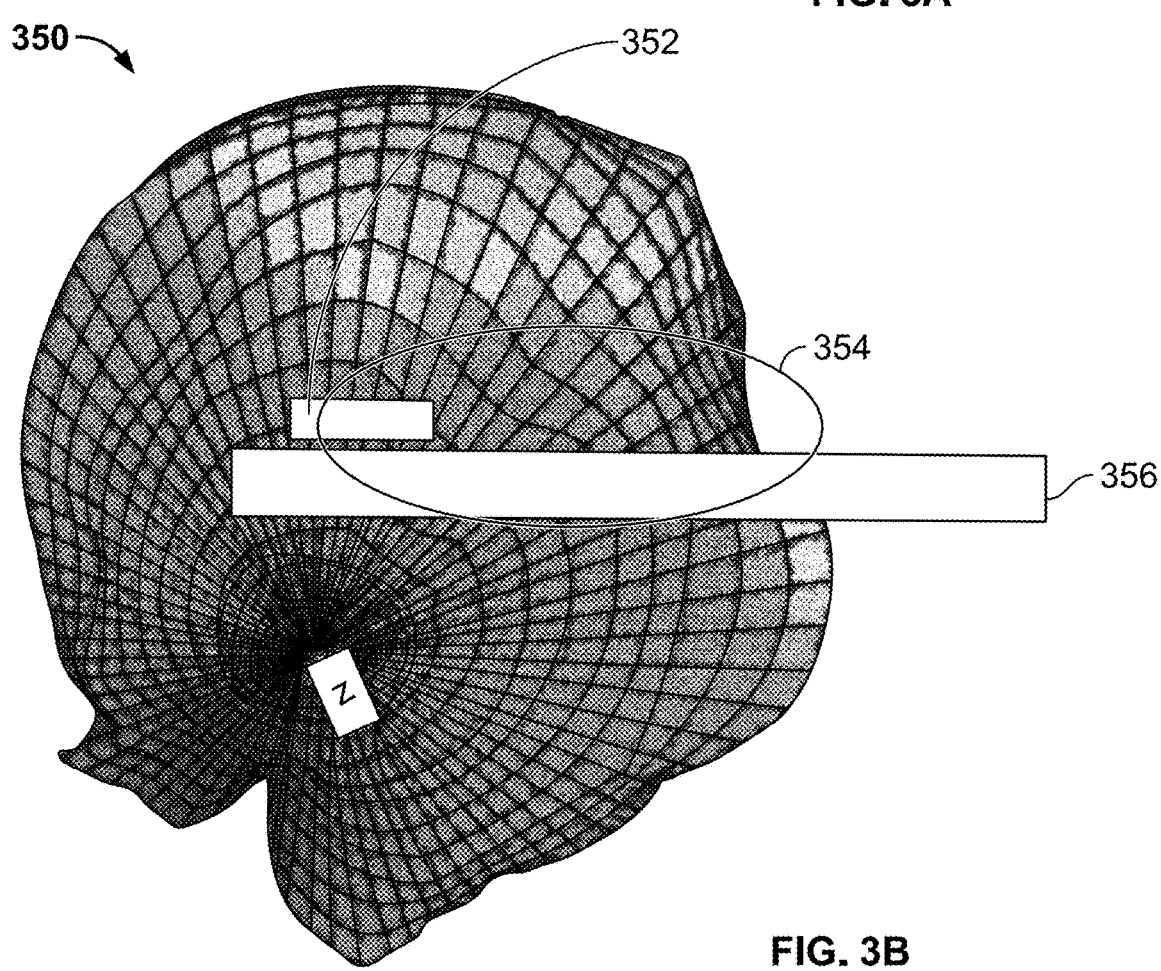
FIG. 3B is a plot depicting a radiation pattern for a conventional antenna at a frequency of 2.4 GHz.

Conversely, with reference to FIG. 3B, conventional antenna 352 (e.g., a trace antenna formed over a substrate 356) has a region 354 of relatively high radiation and, therefore, high sensitivity in a direction oriented back towards substrate 356 over which antenna 352 is formed. Accordingly, conventional antenna 352 is more sensitive to and more likely to absorb noise generated by, the noise-generating components of the media device (e.g., video processing system 108 of FIGS. 1A, 1B or video processing system 708 of FIG. 7).

As mentioned above, the processing of video data having different resolutions can generate noise at different frequencies. Typically, as the resolution of the video data increases, so does the frequency of the noise generated. And, more specifically, as the resolution of the video data increases, the range of frequencies over which noise is generated increases, with the increase occurring as a result of increased frequencies of noise.

For example, when processing video data at a resolution of 1080 p, the video processing system of a streaming media player, in combination with associated electrical interconnects, such as signal pins contained within the player's media connector, can generate noise having a frequency that ranges from 10 megahertz (MHz) up to 4.9 GHz. But when processing video data having higher resolutions, the range of frequencies may increase. For example, when processing video data having a 4K resolution, the noise generated may have a frequency ranging from up to 6 GHz. Video data at an 8K may generate noise up to 48 GHz.

The noise generated by video processing activities in a streaming media player may be generated via two different sources or mechanisms. In a first case, noise generated by the transmission of the video signal itself can generate noise via RF radiation from the components and interconnects of the video processing system. This noise is referred to herein as primary noise and its frequency is generally determined by the frequency of the video signal being transmitted. In addition to primary noise, transient signals and harmonics may occur in the path of the video signal generating noise. This noise is referred to herein as secondary noise. Typically, primary noise has lower frequencies than secondary noise.

Within a particular signal path, the transient and harmonic signals that result in secondary noise can be safely filtered out of the signal path without a negative effect on the video signal itself. That is, filtering the secondary noise will not modify the video signal being transmitted. The transient signals and harmonics do not form part of the video signal and, so, by filtering them out of the signal path, information is not removed from the video signal itself. Conversely, the primary noise cannot be filtered from the signal path because the primary noise results directly from the video signal itself. The primary noise could only be filtered out of the signal path by modifying the video signal itself.

When processing and transmitting video data and video signals at 1080 p resolutions and below, as described above, the noise generated may extend up to 5 GHz. But the portion of the noise having frequencies of 2.4 GHz and above (i.e., the noise frequencies that may interfere with communications using the 2.4 GHz WIFI band and the 5 GHz WIFI band) is secondary noise and may be filtered. For a 1080 p video signal, the portion of noise considered primary noise does not extend into wireless communication bands and generally does not have frequencies greater than 1.5 GHz. But for higher video resolutions, however, such as 4K and 8K resolutions, the primary noise (i.e., noise generated by the video signal itself) can extend from 10 MHz to frequencies greater than 5 GHz and so overlaps wireless communications bandwidths.

Figure 5:
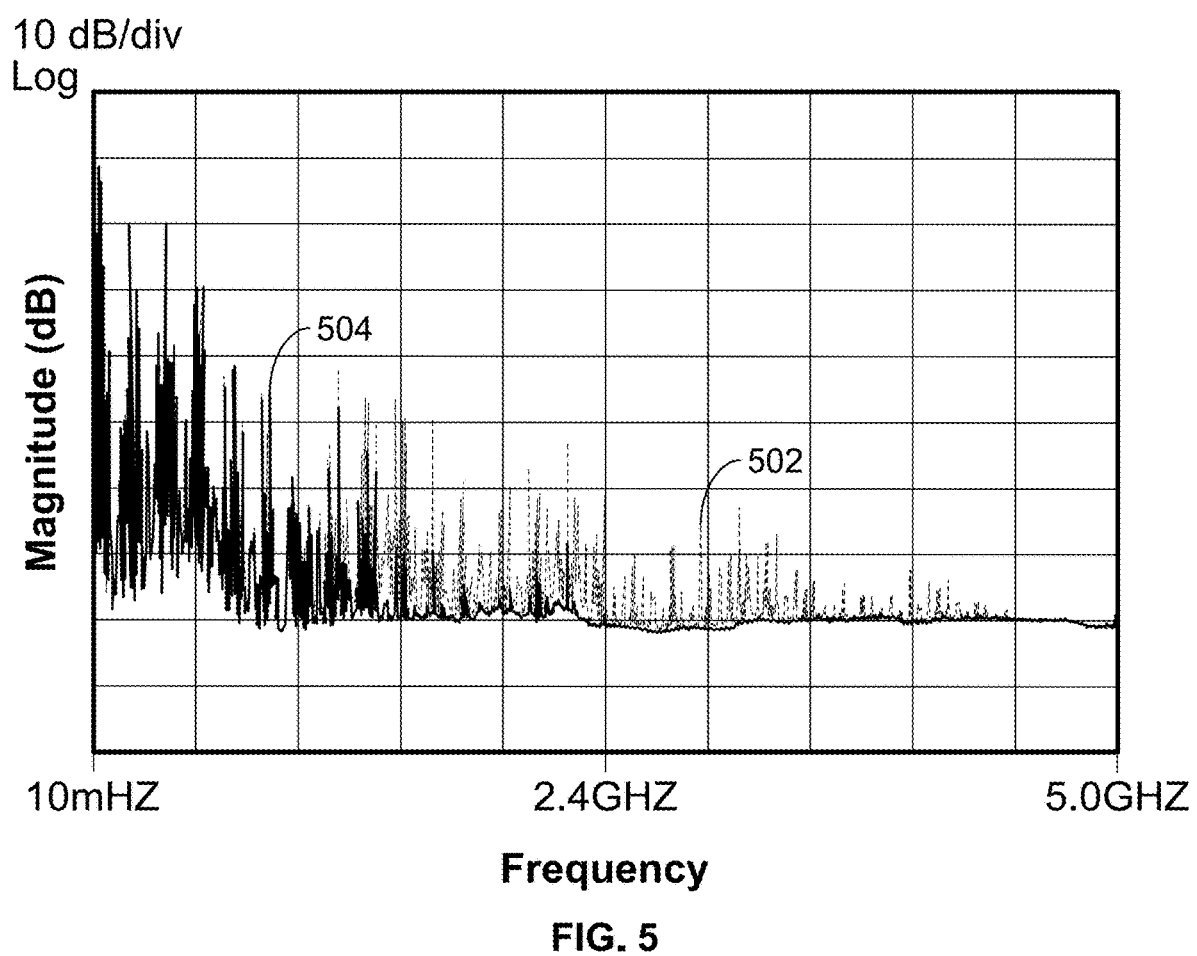
FIG. 5 is a chart depicting the frequency components of a 1080 p video signal before and after filtering by a low pass filter having a threshold frequency of 2.4 GHz.

For this reason, when processing and transmitting video signals at 1080 p resolution, filters can be implemented within a streaming media player to filter the portions of those signals that generate noise having frequencies that overlap with those used for wireless communications. But at higher video frequencies (e.g., 4K and 8K), such filtering may not be implemented, because the filtering could interfere with or degrade the video signal itself FIG. 5 is a chart depicting the frequency components of a 1080 p video signal before and after filtering by a low pass filter having a threshold frequency of 2.4 GHz. The horizontal axis of the chart represents frequency, while the vertical axis represents the magnitude (e.g., measured in decibels) of the components of the video signal at particular frequencies. Signal trace 502 (the dashed line in FIG. 5) represents the unfiltered video signal. As seen in FIG. 5, signal trace 502 has frequency components that extend from a minimum of about 10 MHz to a maximum of about 4.9 GHz. In the filtered signal, represented by signal trace 504 (the solid line in FIG. 5), the magnitude of signal components having frequencies greater than 2.4 GHz have been attenuated—their magnitudes have been significantly reduced—effectively removing those high-frequency components out of the video signal represented by signal trace 504.

Such filtering may be implemented by a smart filter circuit. The filter circuit is configured to determine (either by direct inspection or receipt of an instruction from the media device's video processing system) the current resolution of video data being processed by the streaming media player's video processing systems. Then, depending upon the resolution of that video data, the filter circuit may selectively implementing filtering to reduce noise generation at frequencies that overlap with those of wireless communication systems.

Figure 4:
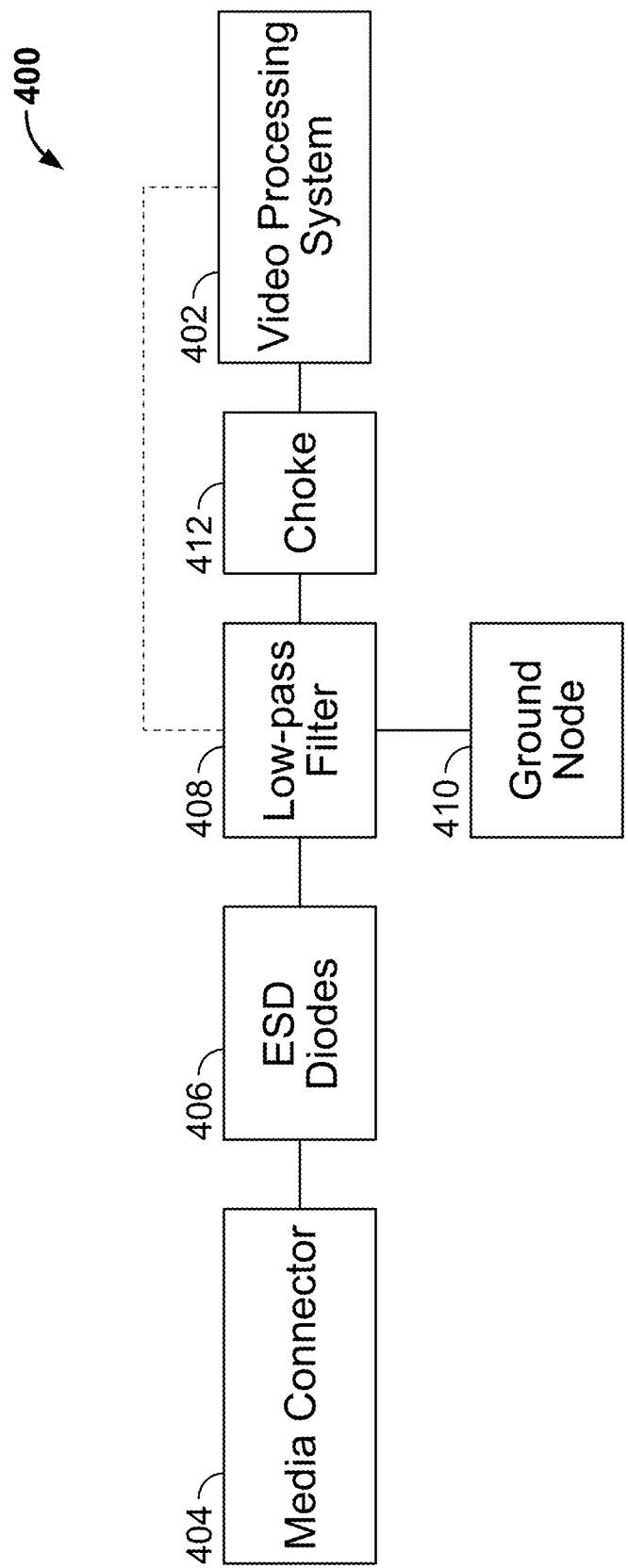
FIG. 4 is a block diagram showing functional components of a streaming media player including a smart filter circuit.

FIG. 4 is a block diagram showing functional components of a streaming media player 400 including a smart filter circuit. Specifically, FIG. 4 depicts the functional components of a signal path of media player 400 from video processing system 402 to an output media connector 404, such as an HDMI connector.

Video processing system 402 (e.g., video processing system 108 of FIGS. 1A and 1B) is configured to receive video data and process the video into an output video signal suitable for transmission to a display device, such as a television, connected to media connector 404. The video signal is then passed into choke 412. Choke 412 may be implemented as a common mode choke and is generally configured to remove common mode noise from the video signal outputted by video processing system 402.

The video signal, having passed through choke 412 then flows through low-pass filter 408 (described in more detail below) and electrostatic discharge (ESD) diodes 406 to media connector 404. ESD diodes 406 are generally operate to protect the relatively delicate circuitry of media player 400, including video processing system 402, from electrostatic discharges that may occur at media connector 404 of device 400. If an electrostatic charge is present at media connector 404 (e.g., when media connector 404 of device 400 is first plugged into a complementary connector on a display device), ESD diodes 406 prevent the electrostatic charge from passing back up through the video signal path to video processing system 402, where such charge could do damage.

Low pass filter 408 is connected to the video signal path between ESD diodes 406 and choke 412. Low pass filter 408 receives an input value from video processing system 402 (indicated by the dashed line) to control the operation of low-pass filter 408 (though in other embodiments, the input value may be received by other components of the media device, such as a system controller. When low-pass filter 408 is not operational, the video signal is passed through low-pass filter 408 directly from choke 412 to ESD diodes 406 without change. When low-pass filter 408 is operational, portions of the video signal received by low-pass filter 408 that have frequencies below a threshold frequency value are passed through low-pass filter 408 to ESD diode 406 and, ultimately, media connector 404. However, portions of the video signal received by low-pass filter 408 that have frequencies greater than a threshold frequency value are filtered out, not passed to ESD diodes 406, and are instead sent to ground node 410. As such, when low-pass filter 408 is active, the magnitude of components in the video signal having a frequency greater than the threshold of low-pass filter 408 are reduced and are not transmitted to media connector 404. This, therefore, reduces the noise generated by media connector 404 at those high frequencies that would normally result from such high-frequency signals being transmitted through the signal pins of media connector 404.

In a typical implementation, the threshold frequency for low-pass filter 408 is set to about 2.4 GHz. In other embodiments, however, the threshold frequency may be equal to 1.5 GHz, though in other embodiments, different threshold frequencies may be utilized (e.g., any frequency between 1.5 GHz and 2.5 GHz). Accordingly, when low-pass filter 408 is operational, signals within the signal path depicted in FIG. 4 having frequencies that overlap with those used in wireless communications (i.e., 2.4 GHz and 5 GHz) are filtered out of the path and sent to ground. As such, those frequencies are not present at media connector 404 and so media connector 404 (and, specifically, the signal pins of media connector 404) will not generate noise based upon those signals at those frequencies. This reduces the likelihood of noise being generated by media connector 404 (and, in fact, the signal path carrying the video signal) interfering with wireless communications.

As discussed above, however, some video signals for higher resolutions (e.g., 4K and 8K) will include components at frequencies greater than 2.4 GHz that are legitimate components of the video signal (i.e., they encode video data). As such, those high-frequency signals cannot be filtered in the same manner as for lower-resolution video signals.

Accordingly, the operation of low-pass filter 408 is controlled by video processing system 402 or another suitable controller based upon the video data being processed by video processing system 402. Specifically, when video processing system 402 is processing video data at or below a minimum resolution (e.g., a resolution of 1080 p or less), video processing system 402 controls the operation of low-pass filter 408 to cause low-pass filter 408 to filter signals from the signal path depicted in FIG. 4 having frequencies greater than a threshold frequency (e.g., 2.4 GHz) of low-pass filter 408. Conversely, when video processing system 402 is processing video data above a minimum resolution (e.g., a resolution of 1080 p or less), video processing system 402 controls the operation of low-pass filter 408 to cause low-pass filter 408 to not filter signals from the signal path depicted in FIG. 4 having frequencies greater than a threshold frequency of low-pass filter 408 (e.g., 2.4 GHz).

In an embodiment, video processing system 402 (or another controller of media device 400) stores a table that indicates, for each video resolution video processing system 402 is configured to process, an indication of whether low-pass filter 408 should be operational.

In this disclosure, the smart filter circuit is considered to include low-pass filter 408, as well as the portion of video processing system 402 (or another system controller) configured to determine the current video resolution being processed and then transmit control instructions to low-pass filter 408 to control its operation based upon that video resolution.

It should be noted that although a low-pass filter is depicted in FIG. 4 and described above, low-pass filter 408 could be replaced by other types of filters (e.g., high-pass or notch filters) configured to provide similar functionality of selectively filtering signals out of the signal chain having frequencies overlapping those used by wireless communication systems with minor modifications to the general signal path layout depicted in FIG. 4. Additionally, although low-pass filter 408 is shown coupled to the signal path between ESD diodes 406 and choke 412, it should be noted that one or more filters (e.g., low-pass filter 408) may be incorporated at various points along the signal path between media connector 404 and video processing system 402.

Figure 6:
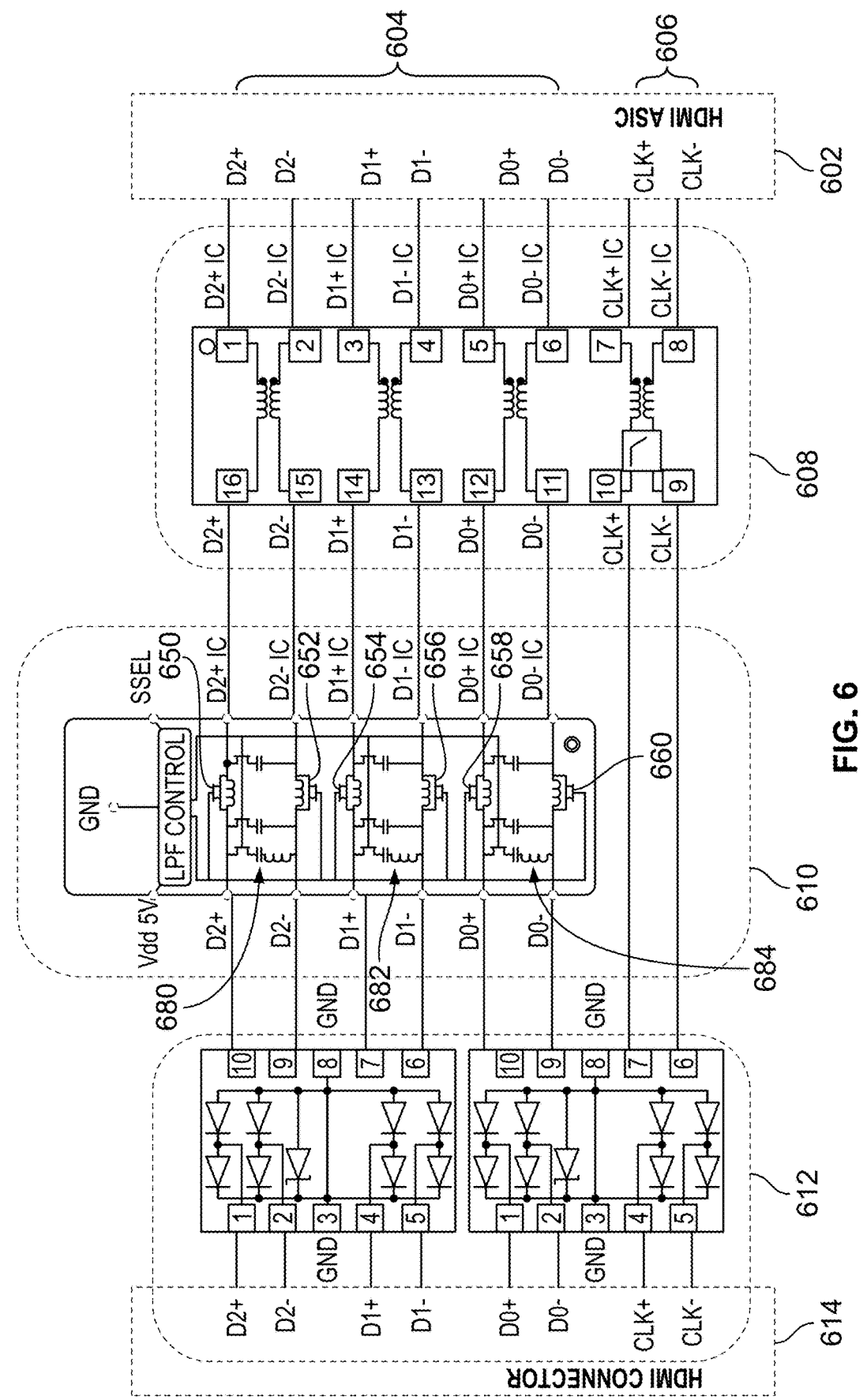
FIG. 6 is a detailed view of an output signal path of a media device including a filter circuit coupled to the output signal path.

FIG. 6 is a detailed view of an output signal path of a media device. The signal path includes video processor 602 configured to output a video signal. As illustrated, video processor 602 includes a number of output signal pins. The output pins include a set of pins 604 configured to carry video data (i.e., the video signals) and clock pins 606 configured to carry timing data. Each data pin 604 of video processor 602 is connected to an input pin of filter 610 through common mode choke 608. The output of clock pins 606 passes through choke 608 and is ultimately passed through filter 610 without change.

Filter 610 includes an input SSEL configured to receive an input signal that controls the operation of filter 610. The value of SSEL may be determined, for example, by an external circuit component such as a video processing system (e.g., video processing system 402 of FIG. 4) and controls the operation of filter 610. If SSEL has a first value, filter 610 will implement low pass filtering. If SSEL has a second value, filter 610 will not implement low pass filtering and will instead pass through the input signal received from common mode choke 608 without modification.

If the remote video processing system determines that relatively low-resolution video data is being processed (e.g., 1080 p or below), the remote video processing system will transmit a signal to the input SSEL instructing filter 610 to implement low pass filtering. In an embodiment, filter 610 will filter or remove signals having a frequency greater than a threshold frequency (e.g., 1.5 GHz) from the signal received from common mode choke 608 before passing that signal to the output of filter 610, which is connected to ESD diodes 612. If, however, the remote video processing system determines that relatively high-resolution video data is being processed (e.g., greater than 1080 p), the remote video processing system will transmit a signal to the input SSEL instructing filter 610 not to implement low pass filtering. Accordingly, filter 610 will not modify the input signal received from common mode choke 608 before passing that signal to the output of filter 610, which is connected to ESD diodes 612.

The outputs of filter 610 (including both data outputs and clock outputs) are passed through ESD diodes 612 (to provide protection for electric charge surges resulting from electrostatic discharge) to an output at HDMI connector 614, where the video signal (potentially filtered, as described above, by filter 610) can be transmitted to a connected display device.

In an embodiment, a streaming media player includes a printed circuit board, a video processor mounted to the printed circuit board, a wireless communications processor mounted to the printed circuit board, and a patch antenna mounted to the printed circuit board. The patch antenna includes a layer of dielectric material, a conductive patch on the dielectric material, and a first antenna feed in a first position with respect to the conductive patch. The first antenna feed is electrically coupled to the wireless communication processor by a first signal line. The patch antenna includes a second antenna feed in a second position with respect to the conductive patch. The second antenna feed is electrically coupled to the wireless communication processor by a second signal line. The first position is orthogonal to the second position and the second position is rotationally offset from the first position by 90 degrees around an axis through a center of the conductive patch. The streaming media player includes a connector coupled to the video processor and configured to removably couple to a connection port on a display device.

In another embodiment, a device includes a substrate, a video processor on the substrate, a wireless communication processor on the substrate, and a patch antenna mounted to the substrate. The patch antenna includes a layer of dielectric material, a conductive patch on the dielectric material, a first antenna feed electrically coupled to the wireless communication processor, and a second antenna feed electrically coupled to the wireless communication processor. The first antenna feed is orthogonal to the second antenna feed. The device includes a connector on the substrate. The connector is electrically coupled to the video processor.

In another embodiment, a device includes a substrate, a video processor on the substrate, and a patch antenna mounted to the substrate. The patch antenna includes a first antenna feed electrically coupled to a wireless communication processor, and a second antenna feed electrically coupled to the wireless communication processor. The first antenna feed is orthogonal to the second antenna feed.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. The HDMI connector is introduced as an example embodiment. However, any connector including a signal pin may adopt the design process to select signal pins for connectors, such as, but not limited to universal serial bus (USB) connector, a peripheral component interconnect (PCI) Express connector, a Thunderbolt connector, or any other connector type.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A streaming media player, comprising:
   a printed circuit board;
   a video processor mounted to the printed circuit board and configured to process video data into a video signal;
   a wireless communications processor mounted to the printed circuit board;
   a patch antenna mounted to the printed circuit board and configured to receive radio frequency signals in a frequency range, the patch antenna including:
      a layer of dielectric material,
      a conductive patch on the dielectric material,
      a first antenna feed in a first position with respect to the conductive patch, the first antenna feed being electrically coupled to the wireless communication processor by a first signal line, and
      a second antenna feed in a second position with respect to the conductive patch, the second antenna feed being electrically coupled to the wireless communication processor by a second signal line, wherein the first position is orthogonal to the second position and the second position is rotationally offset from the first position by 90 degrees around an axis through a center of the conductive patch; and
   a filter circuit configured to reduce a magnitude of a portion of the video signal, the portion of the video signal having a frequency in the frequency range.

2. The streaming media player of claim 1, wherein the layer of dielectric material includes a top surface, a bottom surface separated from the top surface by a distance, a first sidewall extending from the top surface to the bottom surface, and a second sidewall extending from the top surface to the bottom surface and the first antenna feed is on the first sidewall and the second antenna feed is on the second sidewall.

3. The streaming media player of claim 1, wherein a first portion of the dielectric material having a thickness of at least 1 millimeter is between the first antenna feed and the conductive patch and a second portion of the dielectric material having a thickness of at least 1 millimeter is between the second antenna feed and the conductive patch.

4. The streaming media player of claim 1, further comprising:
   a first conductive pin extending through the layer of dielectric material from a top surface of the layer of dielectric material to a bottom surface of the layer of dielectric material and wherein the first antenna feed is electrically coupled to the first conductive pin and a first portion of the conductive patch is between the first antenna feed and the layer of dielectric material; and
   a second conductive pin extending through the layer of dielectric material from the top surface of the layer of dielectric material to the bottom surface of the layer of dielectric material and wherein the second antenna feed is electrically coupled to the second conductive pin and a second portion of the conductive patch is between the second antenna feed and the layer of dielectric material.

5. A device, comprising:
   a substrate;
   a video processor on the substrate, the video processor configured to process video data into a video signal;
   a wireless communication processor on the substrate;
   a patch antenna mounted to the substrate, the patch antenna configured to transmit and receive radio frequency signals in a frequency range and including:
      a layer of dielectric material,
      a conductive patch on the dielectric material,
      a first antenna feed electrically coupled to the wireless communication processor, and
      a second antenna feed electrically coupled to the wireless communication processor, wherein the first antenna feed is orthogonal to the second antenna feed; and
   a filter circuit configured to reduce a magnitude of a portion of the video signal, the portion of the video signal having a frequency in the frequency range.

6. The device of claim 5, wherein a first position of the first antenna feed is rotationally offset around an axis through a center of the conductive patch by 90 degrees from a second position of the second antenna feed.

7. The device of claim 5, wherein a first portion of the dielectric material is between the first antenna feed and the conductive patch and a second portion of the dielectric material is between the second antenna feed and the conductive patch.

8. The device of claim 5, wherein the layer of dielectric material includes a top surface, a bottom surface separated from the top surface by a distance, a first sidewall extending from the top surface to the bottom surface, and a second sidewall extending from the top surface to the bottom surface and the first antenna feed is on the first sidewall and the second antenna feed is on the second sidewall.

9. The device of claim 5, further comprising:
   a first conductive pin extending through the layer of dielectric material from a top surface of the layer of dielectric material to a bottom surface of the layer of dielectric material and wherein the first antenna feed is connected to a first end of the first conductive pin and the conductive patch is between the first antenna feed and the layer of dielectric material; and
   a second conductive pin extending through the layer of dielectric material from the top surface of the layer of dielectric material to the bottom surface of the layer of dielectric material and wherein the second antenna feed is connected to a first end of the second conductive pin and the conductive patch is between the second antenna feed and the layer of dielectric material.

10. The device of claim 5, wherein the conductive patch, the first antenna feed, and the second antenna feed are on a top surface of the layer of dielectric material and the conductive patch does not directly contact the first antenna feed or the second antenna feed.

11. The device of claim 5, wherein the substrate includes a ground isolation region between the patch antenna and the video processor.

12. The device of claim 11, wherein the ground isolation region extends contiguously from a first edge of the substrate to a second edge of the substrate and has a width of between 0.3 millimeters and 3 millimeters.

13. A device, comprising:
a substrate;
a video processor on the substrate, the video processor configured to process video data into a video signal;
a patch antenna mounted to the substrate, the patch antenna configured to receive radio frequency signals in a frequency range and including:
a first antenna feed electrically coupled to a wireless communication processor, and
a second antenna feed electrically coupled to the wireless communication processor, wherein the first antenna feed is orthogonal to the second antenna feed; and
a filter circuit configured to reduce a magnitude of a portion of the video signal, the portion of the video signal having a frequency in the frequency range.

14. The device of claim 13, wherein a first position of the first antenna is rotationally offset around an axis orthogonal to a center of the patch antenna by 90 degrees from a second position of the second antenna feed.

15. The device of claim 13, wherein the patch antenna includes a layer of dielectric material and a conductive patch on the layer of dielectric material and a first portion of the dielectric material is between the first antenna feed and the conductive patch and a second portion of the dielectric material is between the second antenna feed and the conductive patch.

16. The device of claim 13, wherein the patch antenna includes a layer of dielectric material including a top surface, a bottom surface separated from the top surface by a distance, a first sidewall extending from the top surface to the bottom surface, and a second sidewall extending from the top surface to the bottom surface and the first antenna feed is on the first sidewall and the second antenna feed is on the second sidewall.

17. The device of claim 13, wherein the patch antenna includes a layer of dielectric material and a conductive patch, and the conductive patch, the first antenna feed, and the second antenna feed are on a top surface of the layer of dielectric material and the conductive patch does not directly contact the first antenna feed or the second antenna feed.

18. The device of claim 13, wherein the substrate includes a ground isolation region between the patch antenna and the video processor.

* * * * *